(12) United States Patent
Fell et al.

(10) Patent No.: US 8,156,022 B2
(45) Date of Patent: Apr. 10, 2012

(54) METHOD AND SYSTEM FOR PROVIDING PRICE PROTECTION FOR COMMODITY PURCHASING THROUGH PRICE PROTECTION CONTRACTS

(75) Inventors: Robert M. Fell, Summerland, CA (US); Scott Painter, Bel Air, CA (US); Michael R. Bonsignore, Seattle, WA (US); Brian P. Reed, Southlake, TX (US); Gary A. Magnuson, Corpus Christi, TX (US)

(73) Assignee: Pricelock, Inc., Irving, TX (US)

( * ) Notice: Subject to any disclaimer, the term of this patent is extended or adjusted under 35 U.S.C. 154(b) by 445 days.

(21) Appl. No.: 11/705,571

(22) Filed: Feb. 12, 2007

(65) Prior Publication Data

US 2008/0195432 A1   Aug. 14, 2008

(51) Int. Cl.
    *G06Q 40/00*   (2006.01)
(52) U.S. Cl. ......... 705/35; 705/1; 705/4; 705/7; 705/10; 705/28; 705/36; 705/37; 705/38; 705/40; 702/23
(58) Field of Classification Search ............ 705/4, 7, 705/10, 35–38, 1, 28, 40; 702/23
    See application file for complete search history.

(56) References Cited

U.S. PATENT DOCUMENTS

| | | |
|---|---|---|
| 3,691,527 A | 9/1972 | Yamamoto |
| 3,852,576 A | 12/1974 | Rudd |
| 4,723,212 A | 2/1988 | Mindrum et al. |
| 4,821,186 A | 4/1989 | Munakata et al. |
| 4,825,045 A | 4/1989 | Humble |
| 4,910,672 A | 3/1990 | Off et al. |
| 5,056,019 A | 10/1991 | Schultz et al. |
| 5,173,851 A | 12/1992 | Off et al. |
| 5,200,889 A | 4/1993 | Mori |
| 5,202,826 A | 4/1993 | McCarthy |
| 5,481,094 A | 1/1996 | Suda |
| 5,521,364 A | 5/1996 | Kimura et al. |
| 5,612,868 A | 3/1997 | Off et al. |
| 5,710,887 A | 1/1998 | Chelliah et al. |

(Continued)

FOREIGN PATENT DOCUMENTS

AU   2006100751 A4   12/2006

(Continued)

OTHER PUBLICATIONS

Options and Futures; a Tutorial; Roger G. Clarke; Rev. 1996; ISBN 0-943205-16-6.*

(Continued)

*Primary Examiner* — Harish T Dass
(74) *Attorney, Agent, or Firm* — Sprinkle IP Law Group

(57) ABSTRACT

Systems and methods for the provisioning of price protection contracts which provide price protection against adverse fluctuations in the retail price of a commodity to a consumer are disclosed. While these price protection contracts may pertain to almost any type of commodity, certain embodiments of the present invention may provide systems and method for allowing a consumer to obtain price protection on the purchase of fuel. Specifically, embodiments of the present invention may provide the ability for fleet managers to obtain a price protection contract for the purchase of fuel where the price protection contract specifies at least one lock price, quantity, locale and time period such that the price protection contract may guarantee the right to aggregately purchase the quantity of fuel in the locale at the lock price during the time period.

46 Claims, 13 Drawing Sheets

U.S. PATENT DOCUMENTS

| | | | |
|---|---|---|---|
| 5,806,045 | A | 9/1998 | Biorge et al. |
| 5,822,735 | A | 10/1998 | De Lapa et al. |
| 5,862,222 | A | 1/1999 | Gunnarsson |
| 5,873,069 | A | 2/1999 | Reuhl et al. |
| 5,890,137 | A | 3/1999 | Koreeda |
| 6,078,900 | A | 6/2000 | Ettl et al. |
| 6,098,879 | A | 8/2000 | Terranova |
| 6,112,981 | A | 9/2000 | McCall |
| 6,116,505 | A | 9/2000 | Withrow |
| 6,145,741 | A | 11/2000 | Wisdom et al. |
| 6,151,565 | A | 11/2000 | Lobley et al. |
| 6,152,591 | A | 11/2000 | McCall et al. |
| 6,157,871 | A | 12/2000 | Terranova |
| 6,193,155 | B1 | 2/2001 | Walker et al. |
| 6,249,772 | B1* | 6/2001 | Walker et al. ............ 705/26 |
| 6,298,329 | B1 | 10/2001 | Walker et al. |
| 6,321,984 | B1 | 11/2001 | McCall et al. |
| 6,332,128 | B1 | 12/2001 | Nicholson |
| 6,422,464 | B1 | 7/2002 | Terranova |
| 6,526,277 | B1 | 2/2003 | Zicker et al. |
| 6,594,644 | B1 | 7/2003 | Van Dusen |
| 6,601,033 | B1 | 7/2003 | Sowinski |
| 6,611,811 | B1 | 8/2003 | Deaton |
| 6,637,648 | B1 | 10/2003 | Gilgen et al. |
| 6,732,081 | B2 | 5/2004 | Nicholson |
| 6,741,968 | B2 | 5/2004 | Jacoves et al. |
| 6,741,969 | B1 | 5/2004 | Chen et al. |
| 6,754,636 | B1 | 6/2004 | Walker |
| 6,778,967 | B1 | 8/2004 | Nicholson |
| 6,862,580 | B1 | 3/2005 | Ford |
| 6,862,612 | B1 | 3/2005 | Horn et al. |
| 6,885,996 | B2 | 4/2005 | Nicholson |
| 6,965,872 | B1 | 11/2005 | Grdina |
| 6,980,960 | B2 | 12/2005 | Hajdukiewicz et al. |
| 7,054,837 | B2 | 5/2006 | Hoffman et al. |
| 7,080,026 | B2 | 7/2006 | Singh et al. |
| 7,080,034 | B1 | 7/2006 | Reams |
| 7,092,929 | B1 | 8/2006 | Dvorak et al. |
| 7,162,444 | B1 | 1/2007 | Machado, Jr. et al. |
| 7,188,076 | B2* | 3/2007 | Bensemana ............ 705/7.32 |
| 7,343,341 | B2 | 3/2008 | Sandor et al. |
| 7,346,520 | B2 | 3/2008 | Etzioni et al. |
| 7,373,320 | B1 | 5/2008 | McDonough |
| 7,376,580 | B1 | 5/2008 | Walker et al. |
| 7,376,603 | B1 | 5/2008 | Mayr et al. |
| 7,379,890 | B2 | 5/2008 | Myr et al. |
| 7,383,204 | B2 | 6/2008 | McCall et al. |
| 7,437,323 | B1 | 10/2008 | Valkov et al. |
| 7,617,111 | B1 | 11/2009 | Sheppard et al. |
| 7,650,109 | B2 | 1/2010 | Shimakawa et al. |
| 7,747,500 | B2 | 6/2010 | Hwang et al. |
| 7,945,500 | B2 | 5/2011 | Fell et al. |
| 7,945,501 | B2 | 5/2011 | Fell et al. |
| 8,019,694 | B2 | 9/2011 | Fell et al. |
| 8,065,218 | B2 | 11/2011 | Fell et al. |
| 8,086,517 | B2 | 12/2011 | Fell et al. |
| 2001/0039512 | A1 | 11/2001 | Nicholson |
| 2001/0042036 | A1* | 11/2001 | Sanders ............ 705/36 |
| 2001/0049626 | A1 | 12/2001 | Nicholson |
| 2001/0049651 | A1 | 12/2001 | Selleck |
| 2001/0049668 | A1 | 12/2001 | Wright |
| 2002/0013758 | A1 | 1/2002 | Khaitan |
| 2002/0026403 | A1 | 2/2002 | Tambay et al. |
| 2002/0029171 | A1 | 3/2002 | Senior |
| 2002/0035549 | A1 | 3/2002 | Hagio et al. |
| 2002/0038279 | A1 | 3/2002 | Samuelson et al. |
| 2002/0040321 | A1 | 4/2002 | Nicholson |
| 2002/0052793 | A1 | 5/2002 | Dines et al. |
| 2002/0069155 | A1 | 6/2002 | Nafeh et al. |
| 2002/0073007 | A1* | 6/2002 | Ayache ............ 705/36 |
| 2002/0107642 | A1* | 8/2002 | Nishida et al. ............ 702/23 |
| 2002/0120555 | A1 | 8/2002 | Lerner |
| 2002/0138392 | A1 | 9/2002 | LeBlanc |
| 2002/0143616 | A1 | 10/2002 | Hajdukiewicz |
| 2002/0143693 | A1 | 10/2002 | Soestbergen et al. |
| 2002/0161645 | A1 | 10/2002 | Walker et al. |
| 2002/0165809 | A1 | 11/2002 | Gendelman |
| 2002/0194094 | A1 | 12/2002 | Lancaster et al. |
| 2003/0014287 | A1 | 1/2003 | Williams et al. |
| 2003/0018573 | A1 | 1/2003 | Comas et al. |
| 2003/0033154 | A1 | 2/2003 | Hajdukiewicz |
| 2003/0050807 | A1 | 3/2003 | Hoffman et al. |
| 2003/0074267 | A1 | 4/2003 | Acharya et al. |
| 2003/0078787 | A1 | 4/2003 | Hoffman et al. |
| 2003/0088435 | A1 | 5/2003 | King |
| 2003/0088466 | A1 | 5/2003 | Fitzpatrick |
| 2003/0101123 | A1 | 5/2003 | Alvarado et al. |
| 2003/0101125 | A1 | 5/2003 | McGill et al. |
| 2003/0158773 | A1 | 8/2003 | Brunner |
| 2003/0195822 | A1 | 10/2003 | Tatge et al. |
| 2003/0197060 | A1 | 10/2003 | Coyner |
| 2003/0208430 | A1 | 11/2003 | Gershon |
| 2003/0208437 | A1 | 11/2003 | Samuelson |
| 2003/0229571 | A1 | 12/2003 | May |
| 2003/0236738 | A1 | 12/2003 | Lange et al. |
| 2004/0015454 | A1 | 1/2004 | Raines et al. |
| 2004/0024692 | A1* | 2/2004 | Turbeville et al. ............ 705/38 |
| 2004/0034584 | A1 | 2/2004 | Cory, Sr. et al. |
| 2004/0039684 | A1 | 2/2004 | Sandor |
| 2004/0088179 | A1 | 5/2004 | Cogen et al. |
| 2004/0093298 | A1 | 5/2004 | McClure, III et al. |
| 2004/0103003 | A1 | 5/2004 | Mayers et al. |
| 2004/0111358 | A1 | 6/2004 | Lange et al. |
| 2004/0117291 | A1 | 6/2004 | O'Callahan |
| 2004/0122732 | A1 | 6/2004 | Comer |
| 2004/0122764 | A1 | 6/2004 | Bilski et al. |
| 2004/0128263 | A1 | 7/2004 | Dosanjh |
| 2004/0138927 | A1 | 7/2004 | Eydeland et al. |
| 2004/0148236 | A1 | 7/2004 | Steidlmayer |
| 2004/0148249 | A1 | 7/2004 | Kinnear |
| 2004/0158493 | A1 | 8/2004 | Nicholson |
| 2004/0177019 | A1 | 9/2004 | Slavov et al. |
| 2004/0210478 | A1 | 10/2004 | Pettigrew et al. |
| 2004/0215529 | A1 | 10/2004 | Foster et al. |
| 2004/0230493 | A1 | 11/2004 | Tatge et al. |
| 2004/0230520 | A1 | 11/2004 | Reding et al. |
| 2004/0260613 | A1 | 12/2004 | Mills |
| 2004/0260632 | A1 | 12/2004 | Wanasek |
| 2005/0027650 | A1 | 2/2005 | Walker et al. |
| 2005/0044001 | A1 | 2/2005 | Narayanaswami |
| 2005/0091139 | A1 | 4/2005 | Kumar et al. |
| 2005/0097025 | A1 | 5/2005 | Horton et al. |
| 2005/0114252 | A1 | 5/2005 | Beurskens |
| 2005/0144100 | A1 | 6/2005 | Shapiro et al. |
| 2005/0149402 | A1 | 7/2005 | Nicholson |
| 2005/0154669 | A1 | 7/2005 | Streetman |
| 2005/0159974 | A1 | 7/2005 | Moss et al. |
| 2005/0160006 | A1 | 7/2005 | Pate |
| 2005/0160014 | A1 | 7/2005 | Moss et al. |
| 2005/0182660 | A1 | 8/2005 | Henley |
| 2005/0192711 | A1 | 9/2005 | Raines et al. |
| 2005/0209917 | A1 | 9/2005 | Anderson et al. |
| 2005/0209921 | A1 | 9/2005 | Roberts et al. |
| 2005/0216384 | A1* | 9/2005 | Partlow et al. ............ 705/35 |
| 2005/0228747 | A1 | 10/2005 | Gumport |
| 2005/0240492 | A1 | 10/2005 | Grdina |
| 2005/0261916 | A1 | 11/2005 | McCall |
| 2005/0289021 | A1 | 12/2005 | Lagergren |
| 2006/0015424 | A1 | 1/2006 | Esposito et al. |
| 2006/0026095 | A1 | 2/2006 | Alvarado et al. |
| 2006/0031123 | A1 | 2/2006 | Leggett et al. |
| 2006/0036530 | A1* | 2/2006 | Shkedy ............ 705/37 |
| 2006/0080196 | A1* | 4/2006 | Griffin et al. ............ 705/35 |
| 2006/0080265 | A1 | 4/2006 | Hinds et al. |
| 2006/0085252 | A1 | 4/2006 | Kersenbrock |
| 2006/0095362 | A1 | 5/2006 | Hwang et al. |
| 2006/0155423 | A1 | 7/2006 | Budike |
| 2006/0184445 | A1 | 8/2006 | Sandor et al. |
| 2006/0190383 | A1 | 8/2006 | May |
| 2006/0190386 | A1 | 8/2006 | Levy |
| 2006/0212384 | A1 | 9/2006 | Spurgin et al. |
| 2006/0212393 | A1 | 9/2006 | Brown |
| 2006/0218056 | A1 | 9/2006 | Dickman |
| 2006/0241951 | A1 | 10/2006 | Cynamom et al. |
| 2006/0293947 | A1 | 12/2006 | Nicholson |
| 2006/0293952 | A1 | 12/2006 | Nicholson |
| 2006/0293953 | A1 | 12/2006 | Nicholson |

| Publication No. | Date | Inventor |
|---|---|---|
| 2006/0293980 A1 | 12/2006 | Corby et al. |
| 2007/0016502 A1 | 1/2007 | Williamson et al. |
| 2007/0032941 A1 | 2/2007 | Allen |
| 2007/0038553 A1* | 2/2007 | Miller et al. ............ 705/37 |
| 2007/0061174 A1 | 3/2007 | Phillips |
| 2007/0061220 A1 | 3/2007 | Vaid |
| 2007/0095890 A2 | 5/2007 | Elefant |
| 2007/0106559 A1 | 5/2007 | Harrell |
| 2007/0195486 A1 | 8/2007 | Paul et al. |
| 2007/0198385 A1 | 8/2007 | McGill et al. |
| 2007/0203793 A1 | 8/2007 | Hajdukiewicz et al. |
| 2007/0203794 A1 | 8/2007 | Hajdukiewicz et al. |
| 2007/0233616 A1 | 10/2007 | Richards et al. |
| 2007/0255457 A1 | 11/2007 | Whitcomb et al. |
| 2007/0267479 A1 | 11/2007 | Nix et al. |
| 2007/0267482 A1 | 11/2007 | Ruckart et al. |
| 2007/0276738 A1 | 11/2007 | Rajunas, III |
| 2007/0288312 A1 | 12/2007 | Wang |
| 2007/0294159 A1* | 12/2007 | Cottle ............ 705/37 |
| 2008/0005008 A1 | 1/2008 | Alvarado et al. |
| 2008/0015964 A1* | 1/2008 | Shuster ............ 705/36 R |
| 2008/0015976 A1 | 1/2008 | Sandor et al. |
| 2008/0015981 A1 | 1/2008 | Danesh |
| 2008/0027737 A1 | 1/2008 | Watkins |
| 2008/0033833 A2 | 2/2008 | Senior |
| 2008/0080682 A1 | 4/2008 | Ogunwale et al. |
| 2008/0097877 A1 | 4/2008 | Rahal |
| 2008/0097888 A1 | 4/2008 | Sugihara |
| 2008/0114622 A1 | 5/2008 | Crean et al. |
| 2008/0126208 A1 | 5/2008 | Nicholson et al. |
| 2008/0133430 A1 | 6/2008 | Horowitz |
| 2008/0243663 A1 | 10/2008 | Eveland |
| 2009/0198621 A1 | 8/2009 | Schneier et al. |
| 2010/0042488 A1 | 2/2010 | Mcclung, III |

FOREIGN PATENT DOCUMENTS

| | | |
|---|---|---|
| AU | 2007100932 A4 | 10/2007 |
| CA | 2070736 | 12/1992 |
| CA | 2217739 A1 | 4/1996 |
| CA | 2340966 A1 | 9/2001 |
| JP | 2217998 A | 8/1990 |
| JP | 04373069 A | 12/1992 |
| JP | 10111985 A | 4/1998 |
| JP | 2002063347 A | 2/2002 |
| JP | 2002215640 A | 8/2002 |
| JP | 2003108850 A | 4/2003 |
| JP | 2003128198 A | 5/2003 |
| JP | 2003233743 A | 8/2003 |
| JP | 2004145534 A1 | 5/2004 |
| JP | 2004252569 A | 9/2004 |
| JP | 2004318422 A | 11/2004 |
| JP | 2005122766 A | 5/2005 |
| JP | 2005135347 A | 5/2005 |
| JP | 2006335438 A | 12/2006 |
| JP | 2007122592 A | 5/2007 |
| JP | 2007249410 A | 9/2007 |
| WO | WO 9118373 A1 | 11/1991 |
| WO | WO 9214213 | 8/1992 |
| WO | WO 9301466 A1 | 1/1993 |
| WO | WO 9309398 A1 | 5/1993 |
| WO | WO 9606415 | 2/1996 |
| WO | WO 9706250 | 2/1997 |
| WO | WO 9818053 A1 | 4/1998 |
| WO | WO 9835490 A1 | 8/1998 |
| WO | WO 0003022 A2 | 1/2000 |
| WO | WO 0104327 | 1/2001 |
| WO | WO 0125875 A2 | 4/2001 |
| WO | WO 0125989 A1 | 4/2001 |
| WO | WO 0126000 A1 | 4/2001 |
| WO | WO 0126003 A1 | 4/2001 |
| WO | WO 0155885 A2 | 8/2001 |
| WO | WO 0161671 A | 8/2001 |
| WO | WO 0177961 A1 | 10/2001 |
| WO | WO 0188743 A2 | 11/2001 |
| WO | WO 0195225 A1 | 12/2001 |
| WO | WO 0211018 A1 | 2/2002 |
| WO | WO 0212113 A1 | 2/2002 |
| WO | WO 0213091 A1 | 2/2002 |
| WO | WO 0217193 A1 | 2/2002 |
| WO | WO 0233621 A1 | 4/2002 |
| WO | WO 0233635 A1 | 4/2002 |
| WO | WO 0233636 A1 | 4/2002 |
| WO | WO 0233637 A1 | 4/2002 |
| WO | WO 0241120 A2 | 5/2002 |
| WO | WO 0244847 A2 | 6/2002 |
| WO | WO 02061663 A2 | 8/2002 |
| WO | WO 02069109 A2 | 9/2002 |
| WO | WO 02069110 A2 | 9/2002 |
| WO | WO 02075485 A2 | 9/2002 |
| WO | WO 02075488 A2 | 9/2002 |
| WO | WO 02079923 A2 | 10/2002 |
| WO | WO 02079940 A2 | 10/2002 |
| WO | WO 02080041 A1 | 10/2002 |
| WO | WO 02088888 A2 | 11/2002 |
| WO | WO 02088906 A2 | 11/2002 |
| WO | WO 02093302 A2 | 11/2002 |
| WO | WO 02093328 A2 | 11/2002 |
| WO | WO 02098045 A2 | 12/2002 |
| WO | WO 02099589 A2 | 12/2002 |
| WO | WO 02099601 A2 | 12/2002 |
| WO | WO 02103487 A2 | 12/2002 |
| WO | WO 02103489 A2 | 12/2002 |
| WO | WO 03003150 A2 | 1/2003 |
| WO | WO 03012584 A2 | 2/2003 |
| WO | WO 03012585 A2 | 2/2003 |
| WO | WO 03012586 A2 | 2/2003 |
| WO | WO 03012589 A2 | 2/2003 |
| WO | WO 03032112 A2 | 4/2003 |
| WO | WO 03036432 A2 | 5/2003 |
| WO | WO 03036466 A1 | 5/2003 |
| WO | WO 03038375 A1 | 5/2003 |
| WO | WO 03038547 A2 | 5/2003 |
| WO | WO 03038651 A1 | 5/2003 |
| WO | WO 03038675 A1 | 5/2003 |
| WO | WO 03038676 A1 | 5/2003 |
| WO | WO 03053124 A2 | 7/2003 |
| WO | WO 03062738 A2 | 7/2003 |
| WO | WO 03065278 A1 | 8/2003 |
| WO | WO 03069433 A2 | 8/2003 |
| WO | WO 03069840 A1 | 8/2003 |
| WO | WO 03077054 A2 | 9/2003 |
| WO | WO 03079214 A1 | 9/2003 |
| WO | WO 03087708 A1 | 10/2003 |
| WO | WO 03098516 A1 | 11/2003 |
| WO | WO 03104938 A2 | 12/2003 |
| WO | WO 03104944 A2 | 12/2003 |
| WO | WO 03105054 A1 | 12/2003 |
| WO | WO 2004001537 A2 | 12/2003 |
| WO | WO 2004001538 A2 | 12/2003 |
| WO | WO 2004001544 A2 | 12/2003 |
| WO | WO 2004003699 A2 | 1/2004 |
| WO | WO 2004003811 A1 | 1/2004 |
| WO | WO 2004010262 A2 | 1/2004 |
| WO | WO 2004021102 A2 | 3/2004 |
| WO | WO 2004029781 A2 | 4/2004 |
| WO | WO 2004046989 A1 | 6/2004 |
| WO | WO 2004047082 A2 | 6/2004 |
| WO | WO2004059547 A1 | 7/2004 |
| WO | WO 2004061596 A2 | 7/2004 |
| WO | WO 2004061785 A2 | 7/2004 |
| WO | WO 2004072778 A2 | 8/2004 |
| WO | WO 2004072803 A2 | 8/2004 |
| WO | WO 2004077256 A2 | 9/2004 |
| WO | WO 2004084028 A2 | 9/2004 |
| WO | WO 2004084046 A2 | 9/2004 |
| WO | WO 2005057458 A1 | 6/2005 |
| WO | WO 2005065131 A2 | 7/2005 |
| WO | WO2005069871 A2 | 8/2005 |
| WO | WO 2005101996 A2 | 11/2005 |
| WO | WO 2006049779 A1 | 5/2006 |
| WO | WO2006055117 A2 | 5/2006 |
| WO | WO 2006083709 A2 | 8/2006 |
| WO | WO 2006110121 A1 | 10/2006 |
| WO | WO 2007002065 A2 | 1/2007 |
| WO | WO2007004443 A2 | 4/2007 |
| WO | WO2007059165 A1 | 5/2007 |
| WO | WO2007079228 A2 | 7/2007 |

OTHER PUBLICATIONS

"Futures Trading: The Fine Art of Managing Risk, or Shooting"; Shook, Phil. NPN, National Petroleum News. Chicago: Feb. 1992. vol. 84, Iss. 2; p. 37, 4 pgs.*

Options and Futures; a Tutorial; Roger G. Clarke; Rev. 1996; ISBN 0-943205-16-6.*

"Futures Trading: The Fine Art of Managing Risk, or Shooting"; Shook, Phil. NPN, National Petroleum News. Chicago: Feb. 1992. vol. 84, Iss. 2; p. 37, 4 pgs.*

Office Action issued for U.S. Appl. No. 12/030,073, mailed on May 1, 2009, 11 pgs.

International Preliminary Report on Patentability for PCT Application No. PCT/US2008/053669, mailed Aug. 27, 2009, issued Aug. 19, 2009, 9 pgs.

International Preliminary Report on Patentability for PCT Application No. PCT/US2008/053676, mailed Aug. 27, 2009, issued Aug. 19, 2009, 6 pgs.

International Preliminary Report on Patentability for PCT Application No. PCT/US2008/053674, mailed Aug. 27, 2009, issued Aug. 19, 2009, 7 pgs.

International Preliminary Report on Patentability for PCT Application No. PCT/US2008/053686, mailed Aug. 27, 2009, issued Aug. 19, 2009, 6 pgs.

International Preliminary Report on Patentability for PCT Application No. CT/US2008/053687, mailed Aug. 27, 2009, issued Aug. 19, 2009, 6 pgs.

International Preliminary Report on Patentability for PCT Application No. PCT/US2008/053695, mailed Aug. 27, 2009, issued Aug. 19, 2009, 5 pgs.

International Preliminary Report on Patentability for PCT Application No. PCT/US2008/053699, mailed Aug. 27, 2009, issued Aug. 19, 2009, 5 pgs.

International Preliminary Report on Patentability for PCT Application No. PCT/US2008/053724, mailed Aug. 27, 2009, issued Aug. 19, 2009, 6 pgs.

International Preliminary Report on Patentability for PCT Application No. PCT/US2008/059633, issued Oct. 13, 2009, mailed Oct. 22, 2009, 6 pgs.

International Preliminary Report on Patentability for PCT Application No. PCT/US2008/059619, issued Oct. 13, 2009, mailed Oct. 22, 2009, 6 pgs.

International Preliminary Report on Patentability for PCT Application No. PCT/US2008/059609, issued Oct. 13, 2009, mailed Oct. 22, 2009, 6 pgs.

International Preliminary Report on Patentability for PCT Application No. PCT/US2008/059614, issued Oct. 13, 2009, mailed Oct. 22, 2009, 4 pgs.

Final Office Action issued for U.S. Appl. No. 12/030,073 mailed on Nov. 24, 2009, 12 pgs.

Office Action issued for U.S. Appl. No. 12/370,430 mailed Jan. 20, 2010, 13 pgs.

PCT/US2008/053686, International Search Report and Written Opinion mailed Jun. 5, 2008.

PCT/US2008/053669, International Search Report and Written Opinion mailed Jun. 5, 2008.

PCT/US2008/053676, International Search Report and Written Opinion mailed Jun. 5, 2008.

PCT/US2008/053674, International Search Report and Written Opinion mailed Jun. 5, 2008.

PCT/US2008/053687, International Search Report and Written Opinion mailed Jun. 5, 2008.

Chao, et al. "Restructured Electricity Markets: A Risk Management Approach", [Retrieved online from URL:http://www.ieor.berkeley.edu], presented Jul. 1, 2005, 36 pages.

PCT/US2008/053724, International Search Report and Written Opinion mailed Jun. 5, 2008.

PCT/US2008/053695, International Search Report and Written Opinion mailed Jun. 5, 2008.

PCT/US2008/59633, International Search Report and Written Opinion mailed Jul. 8, 2008.

PCT/US2008/059609, International Search Report and Written Opinion mailed Jul. 1, 2008.

PCT/US2008/053699, International Search Report and Written Opinion mailed Jun. 27, 2008.

PCT/US2008/059619, International Search Report and Written Opinion mailed Aug. 15, 2008.

PCT/US2008/059614, International Search Report and Written Opinion mailed Aug. 25, 2008.

GasLimit "Frequently Asked Questions", 2 pages, obtained from http://www.gaslimit.com/faq on Jan. 2, 2008.

GasLimit "Current Gas Prices", 2 pages, obtained from http://www.gaslimit.com/current-gas-prices.php on Jan. 2, 2008.

GasLimit "Terms and Conditions", 4 pages, obtained from http://www.gaslimit.com/terms_and_condition on Jan. 2, 2008.

GasLimit "Quote Steps 1-5", 5 pages, obtained from http://www.gaslimit.com/legacy on Jan. 2, 2008.

GasLimit "Gas Cap Cancellation Information", 1 page, obtained from http://www.gaslimit.com/cancel_info on Jan. 2, 2008.

"Price Changes in the Gasoline Market: Are Midwestern Gasoline Prices Downward Sticky?", Energy Information Administration, Wash., DC; DOE/EIA-0626, pp. i-55, Feb. 1999.

Jacobson, S. "Recognizing Embedded Risks in Energy", 4 pages, downloaded from http://www.derivativesstrategy.com/magazine/archive/1999/1299col4.asp on Jan. 11, 2008.

Gordon, et al. Modelling Farm-Retail Price Linkage for Eight Agricultural Commodities (Technical Report #1/96), 65 pgs, Dept. of Econ, Univ. of Canada & Auckland, Nov. 1996.

Ervin, S., "Commodity Futures Modernization Act of 2000: A Practical Look at the Law that Revolutionized Derivatives Law and Regulation," 6 pages, Copyright 2001 Dechert.

Commodity Futures Trading Commission, Order, DOCID: fr21mr03-45; Federal Register, Notices, vol. 68, No. 55, pp. 1-6, Mar. 21, 2003, obtained from <<wais.access.gpo.gov>>.

"Congress Makes Changes to the Regulation of Futures and Derivatives Transactions", Publications/McDermott Newsletters, McDermott Will and Emery, 10 pages, Jan. 2001.

Marsh, J., Regulation of "Specialist Commodity Dealers" in the United States, Hunton & Williams, London, England, 10 pages, Oct. 19, 2005, obtained from <<www.hunton.com>>.

Request for Continued Examination, Extension of Time and Amendment as filed with U.S. Patent Office on Oct. 6, 2006 in U.S. Appl. No. 09/853,196; 17 pages.

Office Action mailed from U.S. Patent Office on Dec. 13, 2006 in U.S. Appl. No. 09/805,950; 11 pages.

Office Action mailed from U.S. Patent Office on Dec. 15, 2006 in U.S. Appl. No. 09/853,196; 11 pages.

Asplund, M., et al. "Price Adjustments by a Gasoline Retail Chain", Scand. J. of Economics 102(1), 101-121, 2000.

Fischer, A., "Weather futures 'bet' will give Tucson firms a hedge against losses," Arizona Daily Star, Tucson, Arizona, Feb. 5, 1999, 3 pages.

Fuel Bank: lock in your price for gasoline, obtained from http://www.fuelbank.com on May 19, 2008, 1 page.

Tommelleo, D., "PRICELINE.COM plans to let Customers set Prices for Gasoline", The Augusta Chronicle, Augusta, Georgia, Feb. 26, 2000, 2 pages.

Skyline Products: Central Control Fuel Pricing Software, obtained from http://skylineproducts.com on Feb. 10, 2007, 3 pages.

Skyline Products Inc. Press Release: Skyline Products Partners with Excentus to Offer a Certified Fuel Pricing Integration for High-Volume Retailers, 1 page.

Office Action issued for U.S. Appl. No. 12/099,237, mailed May 21, 2010, 8 pgs.

Office Action issued for U.S. Appl. No. 12/099,253, mailed May 25, 2010, 9 pgs.

Office Action issued for U.S. Appl. No. 12/099,224, mailed May 26, 2010, 7 pgs.

Office Action issued for U.S. Appl. No. 12/029,961, mailed Jun. 23, 2010, 13 pgs.

Office Action issued for U.S. Appl. No. 12/370,430, mailed Jul. 7, 2010, 13 pgs.

Office Action issued for U.S. Appl. No. 12/030,012, mailed Jul. 22, 2010, 12 pgs.

Office Action issued for U.S. Appl. No. 12/099,209, mailed Aug. 3, 2010, 17 pgs.

Office Action issued for U.S. Appl. No. 12/030,032, mailed Sep. 28, 2010, 9 pgs.
Office Action issued for U.S. Appl. No. 12/370,395, mailed Oct. 7, 2010, 11 pgs.
Office Action issued for U.S. Appl. No. 12/099,253, mailed on Oct. 26, 2010, 10 pgs.
Office Action issued for U.S. Appl. No. 12/030,119, mailed on Oct. 27, 2010, 16 pgs.
TechWeb, "Bargain Hunters Topple AAA Gas-Price Finder," Manhasset, May 27, 2005, (1 pg.).
Shanley, Will, "Drivers can Use the Internet to Find Cheap Gasoline," Knight Ridder Tribune Business News, Washington, May 26, 2005, (1 pg.).
Day to Day, "Using the Internet to Search for Cheap Gas," Los Angeles, Apr. 27, 2006, (1 pg.).
Maunsell, Nevill Boyd, "City View: Savers and Borrowers Hang on to Shares," Birmingham Post, Post Edition, Birmingham (UK), Nov. 30, 2000, (1 pg.).
Office Action issued for U.S. Appl. No. 12/099,237, mailed on Nov. 10, 2010, 7 pgs.
Office Action issued for U.S. Appl. No. 12/030,086, mailed on Dec. 21, 2010, 13 pgs.
Liu, Lon-Mu, "Dynamic Relationship Analysis of US Gasoline and Crude Oil Prices," Journal of Forecasting, Sep. 1991, p. 521-547. (27 pgs.).
John M. Barron, Beck A. Taylor and John R. Umbeck, "Will Open Supply Lower Retail Gasoline Prices?" Contemporary Economic Policy, Jan. 2004, pp. 63-77. (15 pgs).
Franklin R. Edwards and Michael S. Carter, "The Collapse of Metallgesellschaft: Unhedgeable Risks, Poor Hedging Strategy, or Just Bad Luck?" The Journal of Futures Markets, May 1995, p. 211. (54 pgs.).
Office Action issued for U.S. Appl. No. 12/029,961, mailed on Nov. 17, 2010, 15 pgs.
Office Action issued for U.S. Appl. No. 12/030,041, mailed on Nov. 16, 2010, 14 pgs.
Office Action issued for U.S. Appl. No. 12/370,430, mailed on Jan. 13, 2011, 15 pgs.
Office Action issued for U.S. Appl. No. 12/099,209, mailed on Jan. 20, 2011, 19 pgs.
Office Action issued for U.S. Appl. No. 12/099,224, mailed on Nov. 12, 2010, 8 pgs.
Notice of Allowance issued for U.S. Appl. No. 12/099,224, mailed on Mar. 1, 2011, 5 pgs.
Notice of Allowance issued for U.S. Appl. No. 12/099,237, mailed on Mar. 3, 2011, 5 pgs.
"Locked-in rates for heating oil burn consumers," David Dishneau Associated Press, Journal—Gazette, Ft. Wayne, Ind. Oct. 11, 2006, 3 pgs.
"Fuel hardy as gas and oil prices rise, shoppers can place a premium on the pennies they save by using their heads at the pump," Kristen Andresen, Bangor Daily News, Bangor, ME, Oct. 1, 2005, 3 pgs.
Office Action for U.S. Appl. No. 12/030,041, mailed on Apr. 12, 2011, 19 pgs.
Office Action for U.S. Appl. No. 12/370,395, mailed on Apr. 13, 2011, 12 pgs.
Office Action issued for U.S. Appl. No. 12/029,961, mailed May 12, 2011, 14 pgs.
Office Action issued for U.S. Appl. No. 12/030,032, mailed May 23, 2011, 10 pgs.
Office Action issued for U.S. Appl. No. 13/076,567, mailed May 24, 2011, 6 pgs.
Office Action issued for U.S. Appl. No. 13/076,741, mailed May 24, 2011, 6 pgs.
Final Office Action issued for U.S. Appl. No. 12/370,430, mailed Jun. 1, 2011, 16 pgs.
Office Action issued for U.S. Appl. No. 13/210,602, mailed Oct. 11, 2011, 7 pgs.
Final Office Action issued for U.S. Appl. No. 12/030,119 mailed on Jul. 8, 2011, 5 pgs.
Notice of Allowance issued for U.S. Appl. No. 12/030,086, mailed Jul. 26, 2011, 14 pgs.
Office Action issued for U.S. Appl. No. 12/099,253, mailed Aug. 29, 2011, 12 pgs.
Final Office Action issued for U.S. Appl. No. 12/029,961, mailed Nov. 21, 2011, 22 pgs.
Notice of Allowance issued for U.S. Appl. No. 12/370,430, mailed Jan. 26, 2012, 15 pages.
Office Action issued for U.S. Appl. No. 12/370,395, mailed Dec. 30, 2011, 10 pages.
Final Office Action issued for U.S. Appl. No. 12/099,253, mailed Jan. 9, 2012, 22 pages.

* cited by examiner

METHOD AND SYSTEM FOR PROVIDING PRICE PROTECTION FOR COMMODITY PURCHASING THROUGH PRICE PROTECTION CONTRACTS

TECHNICAL FIELD OF THE INVENTION

This invention relates generally to systems and methods for commodity purchasing, and in particular to systems and methods for commodity purchasing which allow consumers to protect against variability in the market for a commodity. Even more particularly, embodiments of the present invention relate to systems and methods for commodity purchasing which allow a consumer to obtain protection against adverse fluctuations in the retail price of a commodity.

BACKGROUND OF THE INVENTION

Almost all commodities that consumers purchase fluctuate in price on a regular basis. The periodicity of these fluctuations depends heavily on a variety of factors, including supply and demand, or variables associated with the supply and demand. Certain commodities are more volatile than others, however. These commodities are usually in relatively heavy demand or are widely consumed such that any disruption in the supply of the commodity may cause a commensurate market spike in the prices of these goods. Products of this type include fuel products such as gasoline or diesel, heating oil, natural fuel, crude oil, etc. Disruptions in the supply of these products (or commodities from which these products are produced) such as those caused by worlds events, natural disasters, etc. may cause the price of these commodities to jump markedly in a relatively short amount of time. These price spikes are quite noticeable, as these types of products are extensively consumed and fluctuations in the price of these products may occur relatively rapidly.

The severity of the effects of these price spikes on a given individual or entity is usually tied directly to the amount of the product consumed. Thus, while individual consumers are certainly affected by spikes in the price of a commodity such as gasoline or diesel, these effects may be even more pronounced with regards to large consumers of the commodity. For example, with respect to gasoline or diesel, businesses which rely on a fleet of vehicles to conduct their day to day operations may be severely financially strained by an increase in the price of the commodity. Furthermore, these constant fluctuations in price make anticipating future expenses for the commodity difficult, creating budgeting and accounting issues for these businesses.

Consequently, many individual consumers and businesses desire to financially protect themselves from potential increases in the price of a commodity to not only lower costs for themselves but, additionally, to create greater predictability in future costs for that commodity. There are currently a variety of schemes that allow consumers to purchase commodities, one example of these types of schemes is a fuel card, which is similar to the concept of a gift card. Consumers may purchase a fuel card such that the fuel card has an associated value. Whenever the fuel card is used to purchase fuel at a retail point of sale location, however, the retail price at the time of purchase may be used to subtract value from the fuel card. Thus, the consumer is not protected from adverse fluctuations in the market price of fuel.

Suppose, for example, that a consumer purchases a fuel card with a value of $100 dollars. The consumer may then make a first purchase of 4 gallons of fuel at a time when the retail price of fuel is $2.50, thus for this purchase a value of $10.00 (4 gallons times the $2.50 cost per gallon) is deducted from the value of the fuel card such that amount remaining on the fuel card which may be used to purchase fuel is $90.00. The consumer then makes a second purchase of 4 gallons of fuel at a different time where the retail price of fuel is $3.00. In this case, $12.00 (4 gallons times the $3.00 cost per gallon) is subtracted from the value of the fuel card such that the fuel card may still be used to purchase $78.00 (the $12.00 of the current purchase subtracted from the $90.00 of value remaining on the fuel card) of fuel. As can be seen then, when consumers utilize these schemes they are not protected from fluctuations in the retail price of a commodity as the purchase of the commodities at a particular time occurs at the retail price in effect at that time.

Some purchasing systems have been introduced in certain industry segments in an effort to address this issue. For example, there are certain schemes which allow a consumer to purchase a good or service and take later delivery, in whole or in part, such as purchasing a quantity of fuel which is physically deposited in a storage tank for future at will consumption. In other words the physical product itself has to be ordered and deposited into a storage facility, which has a limited capacity.

These types of systems are cumbersome for a variety of reasons: not only do they require dedicated storage, but additionally, delivery must be taken at the storage location itself. Moreover, the quantity of the commodity purchased has been pre-purchased, thus to utilize this method beneficially may require a preternatural ability to forecast where the market price for the product is going (e.g. will it become more or less expensive), estimate a consumption pattern for the commodity and, based upon these forecasts, estimates, current retail price, and myriad other factors, determine how much of the commodity is desired. As may be imagined these types of schemes are a rather impractical way for businesses to protect themselves against price fluctuations in a commodity and may be almost impossible for a consumer to utilize.

To remedy defects of the purchase and delivery systems discussed above, other schemes have been introduced whereby an individual consumer or a business consumer (for example a fleet manager) may purchase a quantity of a commodity (such as fuel) at the then prevailing retail price such that an account associated with the consumer is credited with the amount purchased. At this point, the physical commodity (e.g. fuel) has not actually been delivered but a quantity is held on reserve that can be redeemed in part or in whole at a variety of locations. While this type of system allows consumers or business to take delivery of the commodity in smaller quantities at a variety of locations it manifests many of the same problems as the purchase and delivery systems discussed above.

More specifically, while the delivery options have changed (e.g. it is now possible to take delivery at many locations in many installments instead of storing the purchase commodity) the purchasing of the commodity remains the same. In other words, in both cases the transaction for the commodity has been consummated; the consumer has made a purchase of a specified quantity of the commodity at a specified retail price.

Consequently, the drawbacks of the purchase and delivery systems discussed above apply equally well here. These systems require the ability to forecast the market for the commodity, estimate a consumption pattern for the good, and based upon these forecasts, estimates, the current retail price, and myriad other factors, determine how much of the commodity is desired.

From a financial perspective these types of systems have an even greater drawback: they only protect a consumer from potential up ticks in the retail price of the commodity. To elucidate, if a consumer purchases a certain quantity of a commodity at a certain retail price and the retail price for that commodity does indeed go up the consumer has saved himself the difference between the retail price at which he purchased and the increased retail price.

Suppose, however, that the consumer is incorrect in predicting that retail prices for the commodity will increase. In this case, the consumer is forced to choose between buying the commodity at the prevailing (lower) retail price and using the pre-purchased commodity (paid for at the previous higher retail price). This places the consumer in an undesirable situation. If the consumer's forecast for a needed quantity of a commodity is correct, the desired amount of the commodity has been pre-purchased and thus, buying the commodity at the prevailing retail price may lead to unused capacity vis-à-vis the commodity. The consumer must choose between saving the margin between the lower prevailing retail price and the pre-purchased price and having unused capacity.

Complicating the issue further, the more volatile the price of the commodity and the larger the volume of the commodity consumed the more complicated these types of calculations become. For example, suppose a fleet manager pre-purchases a quantity of fuel that he anticipates his fleet will utilize for a certain time period at a pre-purchase retail price. Everyday that the prevailing retail price for fuel is below the pre-purchase retail price the fleet manager must determine if it is financially beneficial to purchase fuel at the then prevailing retail price given the amount of fuel the fleet has consumed, the amount of fuel the fleet manager anticipates the fleet will consume, the pre-purchase retail price, the prevailing market price and a whole host of other variables. Many of these variables, however, remain in a constant state of flux. As may be imagined then, the calculations that the fleet manger must make to determine an optimum fuel purchasing strategy grow increasingly more complicated.

Thus, there is a need for systems and methods for commodity purchasing which allow consumers to protect against variability in the price for a commodity by allowing a consumer to obtain price protection against adverse fluctuations in the price of a commodity.

SUMMARY OF THE INVENTION

Systems and methods for the provisioning of price protection contracts which provide price protection against adverse fluctuations in the retail price of a commodity to a consumer are disclosed. While these price protection contracts may pertain to almost any type of commodity, embodiments of the present invention may provide systems and method for allowing a consumer to obtain price protection on the purchase of fuel. Specifically, embodiments of the present invention may provide the ability for consumers to obtain a price protection contract for the purchase of fuel where the price protection contract specifies at least one lock price, quantity, locale or time period such that if the retail price of fuel goes above the lock price in the locale fuel may be purchased at the lock price at any of a number of associated retail point of sale locations within the locale, otherwise fuel may be purchased at the then prevailing retail price. Thus, the price protection contract may guarantee for the time period the right to aggregately purchase the quantity of fuel in the locale at the lock price.

Thus, utilizing embodiments of the present invention a consumer may protect himself from adverse fluctuations in the market for fuel for the time period specified by providing a pre-payment for a quantity of fuel at a lock price such that the quantity of fuel may be aggregately purchased using the prepayment amount. Thus, if the retail price of fuel should exceed the lock price the consumer may purchase fuel at the lock price, saving the difference between the retail price of fuel and the lock price. By the same token, however if the retail price of fuel falls below the lock price fuel may be purchased by the consumer at the retail price. Additionally, at the end of any time period associated with the price protection contract if the pre-payment amount has not been consumed through the purchase of fuel at the lock price it may be refunded to the consumer, applied to the pre-payment of fuel associated with another price protection contract at the lock price corresponding to that price protection contract or otherwise applied in a manner beneficial to the consumer. In this manner, embodiments of the present invention may present the opportunity for a business to realize significant cost saving opportunities by reducing fuel costs for the businesses' fleet and allow businesses to better account for future fuel costs by increasing the predictability of future fuel costs.

Embodiments of the present invention may provide a number of other advantages. Specifically, embodiment of the present invention may provide myriad opportunities for revenue generation for a provider of the price protection contracts including: charging a consumers a certain amount for the ability to obtain the price protection contract itself, charging a consumer according to the quantity of fuel covered by the price protection contract, inclusion of an insurance premium on the lock price provided to the consumer through the price protection contract, charging a membership fee charged to those who desire to utilize various aspects or functionalities provided by a price protection system, earning interest on various monetary transactions that occur during the obtainment and exercise of price protection contracts through the advertising and cross-selling of related products to consumers or other means.

Embodiments of the invention disclosed herein, or portions thereof, can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

Figure 1:
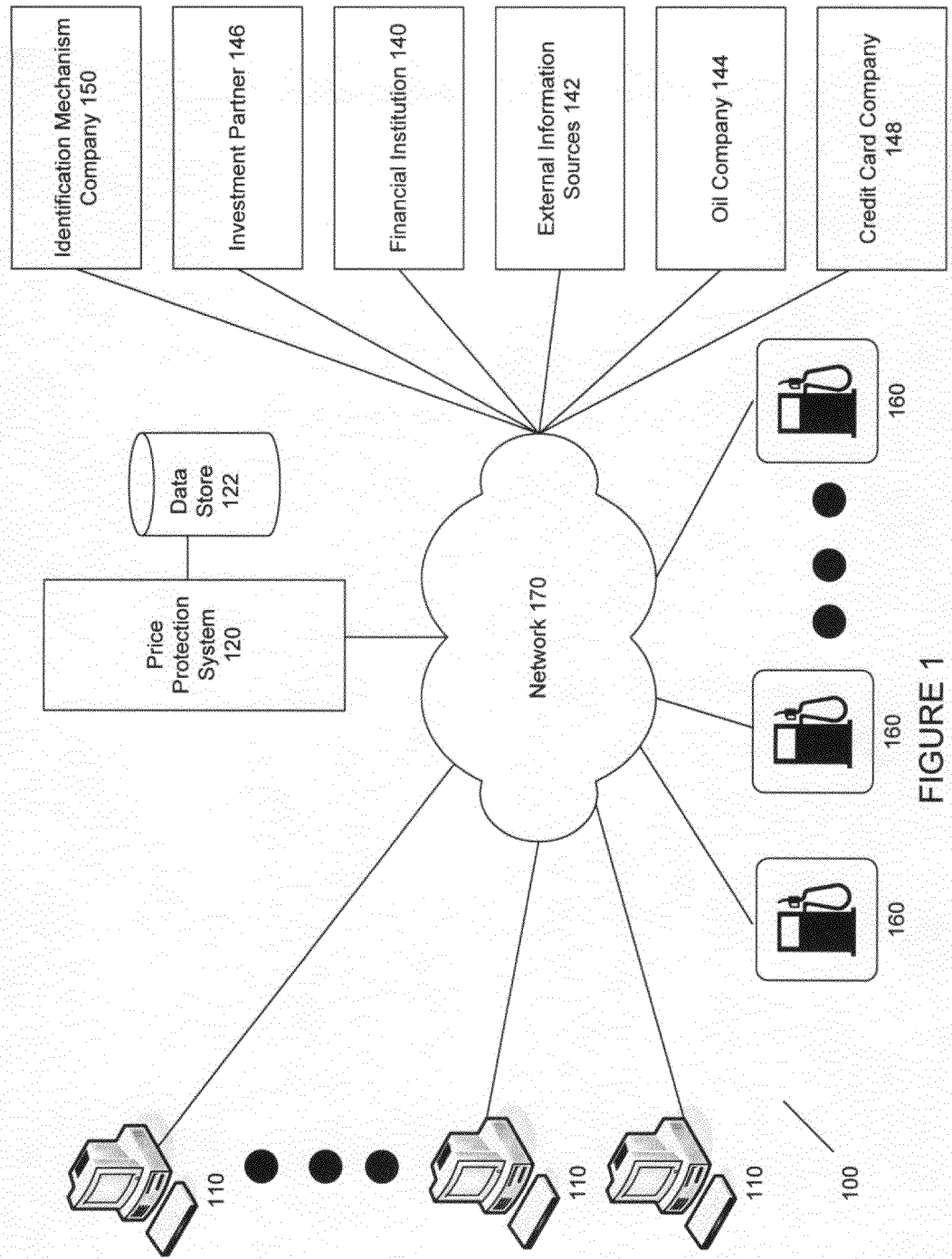
FIG. 1 is a block diagram illustrating one embodiment of a topology which may be used to implement embodiments of the present invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure. Explanations which may helpful to an understanding of the systems and methods of the present invention may be found in Unites States Patent Application Publication No. 2003/0033154 A1 entitled "System and Method for Providing a Fuel Purchase Incentive with the Sale of A Vehicle" by inventors Richard Stanley Hajduklewicz et al filed on May 11, 2001 and United States Patent Application Publication No. 2002/0029171 A1 entitled "Electronic Quantity Purchasing System" by inventor Rodney Senior filed Mar. 15, 2001, both of which are fully incorporated herein by reference for all purposes.

Reference is now made in detail to the exemplary embodiments of the invention, examples of which are illustrated in the accompanying drawings. Wherever possible, the same reference numbers will be used throughout the drawings to refer to the same or like parts (elements). The systems and methods of the invention may be particularly useful for providing price protection for the purchase of fuel by fleet drivers and thus it is in this context that embodiments of the invention may be described. It will be appreciated, however, that embodiments of the systems and methods of the present invention may be applicable for providing price protection for the purchase of almost any desired commodity by any type of consumer.

One of the reasons that embodiments of the present invention may be usefully applied to provide price protection for the retail purchase of fuel or diesel by fleet drivers, however, is the size and composition of the market. It is estimated that in the United States there are currently around 41 million fleet vehicles in operation and the majority of fuel purchased in the United States is purchased expressly for these fleets. Thus, significant cost saving opportunities may be realized by a business by reducing fuel costs for the businesses' fleet. Similarly, gains in predictability may allow businesses to better account for future fuel costs. Thus, it is desired to reduce costs and unpredictability associated with fuel expenditures for a business.

To achieve these goals, consumers may wish to obtain a price protection contract for the purchase of fuel where the price protection contract may provide the ability for a consumer to reduce the costs and unpredictability associated with fuel purchasing by protecting them from adverse market price fluctuations. In one embodiment of the systems and methods of the present invention a price protection contract for fuel associated with a refundable pre-payment is provided. Specifically, embodiments of the systems and methods of the present invention may provide a price protection contract with a lock price such that by pre-paying for a quantity of fuel at the lock price the consumer obtains the right to aggregately obtain (i.e. obtaining varying quantities at various locations) this quantity of fuel at the lock price. Thus, by pre-paying for a quantity of fuel at the lock price a consumer may be protected against any adverse fluctuations in the market price.

More particularly, embodiments of such a price protection contract may protect a consumer against adverse fluctuations while still allowing the consumer to take advantage of any beneficial fluctuations that occur in the market price by allowing a consumer to purchase fuel at a lock price if the prevailing retail price of fuel at the time of purchase is above the lock price while still allowing a consumer to purchase fuel at the prevailing retail price if the prevailing retail price is below the lock price. In other words, if the prevailing retail price of fuel at the time of a purchase is above the lock price associated with the price protection contract fuel may be purchased at the lock price by the consumer and the cost of the purchase (e.g. the quantity of gasoline at the lock price) is paid for from a pre-payment amount provided by the consumer at the time when the consumer obtained the price protection contract. If, however, the prevailing retail price of fuel at the time of the purchase is below the lock price the consumer may purchase the fuel at the then prevailing retail price and the cost of the purchase paid via some alternate payment method, such as a credit card. At the end of a time period associated with the price protection contract, then, any pre-payment amount remitted by the consumer for the purchase of fuel under the price protection contract may be refunded to the consumer, applied to a pre-payment associated with another price protection contract, or otherwise utilized in a manner beneficial to the consumer.

Price protection contracts of the type provided by embodiments of the present invention may be provided utilizing a financial institution which is capable of hedging its position in the market to enable delivery of price protection against an increase in the cost of fuel. Thus, embodiments of the present invention may provide a consumer distribution mechanism between the financial institution which is capable of hedging its position to enable delivery of price protection against an increase in fuel prices and a consumer. By acting as an intermediary between a consumer and the financial institution the mechanics of any price protection provided by the financial institution itself can be made invisible to the consumer.

More specifically, based upon a number of factors, including its ability to hedge its position in a market, a financial institution may provide a strike price matrix for fuel comprising a strike price and an associated insurance cost, such that by paying the associated insurance cost an entity can be indemnified for any amount paid for fuel at a price above the strike price. For a variety of reasons, however, financial institutions which have this capability may have little desire to deal directly with consumers. Consequently, it is difficult if not impossible for a consumer to obtain price protection against an increase in the cost of fuel directly from a financial institution. Currently no mechanism or capability exists to provide price protection from a financial institution to a consumer. This invention provides embodiments of systems and methods under which this price protection can be provided from a financial institution to the consumer plus revenue models operable to cover costs paid to the financial institution and generate profit from the provisioning of this price protection In particular, embodiments of the systems and methods of the present invention may function as an intermediary between a financial institution and the consumer market so that consumers can obtain a price protection contract for fuel without any direct dealings with the financial institution. In fact, any dealings with, or indemnification obtained from, the financial institution may be virtually invisible to the consumer. As far as the consumer is concerned he is dealing solely with the intermediary.

To accomplish this provisioning of price protection contracts then, embodiments of the systems and methods of the present invention may determine a price protection contract based upon the strike prices and associated insurance costs provided by the financial institution, obtain a pre-payment associated with the price protection contract and process purchases made by the consumer.

By acting as an intermediary between the financial institution and consumers a number of revenue generation opportunities may present themselves. This revenue may be used by the providers of the price protection contracts to offset the cost of obtaining price protection from the financial institution (e.g. the insurance costs paid to the financial institution) and to generate profit for the providers of the price protection contracts. These revenue generation opportunities may include earning interest on any pre-payment provided from a consumer for the purchase of fuel under the price protection contract or on any other monies provided by the consumer in conjunction with the price protection contract, charging a consumer a certain amount for the ability to obtain the price protection contract itself, inclusion of an insurance premium on the lock price provided to the consumer through the price protection contract, charging a membership fee to those who desire to utilize analytics or other functionality and the advertising and cross-selling of related products to consumers among myriad others.

By acting as an intermediary between the financial institution and the consumer by utilizing the financial institution to provide price protection contracts to consumers while simultaneously shielding consumers and the financial institution from one another a symbiotic relationship may exist between the providers of the price protection contracts and the financial institution. As providers of the price protection contract may interface with the consumers and retail point of sale locations where consumers conduct purchase transactions, data which may be useful to the financial institution for a variety of reasons may be obtained. In particular, a provider of price protection contracts may be able to determine demand for these price protection contracts and provide this demand to the financial institution. Similarly, by interacting with retail point of sale locations or other sources a provider of price protection contracts may have specialized knowledge regarding current retail prices. This data may also be provided to the financial institution. In turn, the financial institution may determine the strike prices and associated insurance costs provided to embodiments of the systems and methods of the present invention.

As can be seen from the above description then, it is desirable to act as an intermediary between a financial institution which can hedge its position in the market and utilize this hedging ability to provide strike prices and insurance costs and consumers to provide price protection contracts to the consumers. To that end, attention is directed to systems and method for allowing a consumer, such as a business (e.g. a fleet manager associated with a business) or individual, to obtain price protection on the purchase of fuel. Specifically, embodiments of the present invention may provide the ability for consumers to obtain a price protection contract for the purchase of fuel where the price protection contract specifies at least one lock price, quantity, locale and time period such that if at any point during the time period the retail price of fuel goes above the lock price in the locale fuel may be purchased at the lock price within the locale, otherwise fuel may be purchased at the prevailing retail price. Thus, the price protection contract may guarantee the right to aggregately purchase (i.e. using multiple distinct purchases of varying quantities at various locations) the quantity of fuel in the locale at the lock price.

To utilize an example, a fleet manager, based upon his needs, may obtain a price protection contract giving him the right to purchase 100 gallons of diesel within Travis County for a six month time period at a $3.50 per gallon lock price. Now suppose that one week later a driver associated with the fleet manager purchases 15 gallons of diesel in Travis County at a then prevailing retail price of $3.75 per gallon. In this case the 15 gallons of diesel fuel may be purchased at $3.50 per gallon and the 15 gallons deducted from the quantity of fuel protected such the fleet manger now has the right to purchase a remaining quantity of 85 gallons of diesel within Travis County for the remainder of the six month time period at a $3.50 per gallon lock price.

Continuing with the example, suppose that two weeks later a driver associated with the fleet manager purchases diesel in Travis County at a then prevailing retail price of $3.25 per gallon. In this case, as the prevailing retail price at the time of purchase ($3.25) is below the lock price of the price protection contract ($3.50), the diesel may be purchased at the lower prevailing retail price ($3.25) and the quantity of fuel purchased is not subtracted from the quantity of diesel (e.g. 85 gallons) which the fleet manager has the right to purchase within Travis County for the remainder of the six month time period at a $3.50 per gallon lock price.

Further suppose now that for the remainder of the six months the prevailing retail price of diesel remains below the $3.50 lock price of the price protection contract, and thus no diesel is purchased by fleet drivers under this price protection contract. At the end of the six months then the price protection contract expires and the fleet manager is under no obligation to purchase the remainder of the 85 gallons of diesel covered by the price protection contract. Furthermore, any pre-payment amount which the fleet manager may have remitted to cover the purchase of the remaining 85 gallons of diesel may either be refunded back to the fleet manager, used to obtain other price protection contracts, used as the pre-payment for quantities of fuel covered under these other price protection contracts, etc.

Embodiments of the systems and methods of the present invention may be better explained with reference to FIG. 1 which depicts one embodiment of a topology which may be used to implement embodiments of the systems and methods of the present invention. Topology 100 comprises price protection system 120 which is coupled through network 170 to computing devices 110 (e.g. computer systems, personal data assistants, kiosks, dedicated terminals, etc), financial institution 140, external information sources 142, one or more oil companies 144, one or more investment partners 146, one or more credit card companies 148, a identification mechanism company 150 and one or more associated retail point of sale locations 160. Network 170 may be for example, the Internet or a wide area network (WAN), or any other type of conventional or non-electronic communication link such as mail, courier services or the like.

Price protection system 120 may be a computer system with a central processing unit executing a software application (e.g. computer executable instructions embodied on a computer readable medium) that performs at least some of the functionality associated with embodiments of the present invention. Furthermore, price protection system 120 may include data store 122 operable to store received data, data determined during operation or any other type of data associated with embodiments of the present invention or determined during the implementation of those embodiments.

Price protection system 120 may provide a wide degree of functionality including presenting an interface for interaction with price protection system 120 such as a set of web pages to users of devices 110, receiving and responding to queries from users at computing devices 110, interfacing with financial institution 140 to provide data gathered, or determined, by price protection system 120 to financial institution 140 or receive data from financial institution 140, interfacing with associated retail point of sale locations 160 to obtain purchase or other point of sale data, interfacing with external information sources 142 to obtain desired data, interfacing with credit card company 148 or identification mechanism company 150 to obtain or send information, etc.

Credit card company 148 may be a company which provides credit cards and processes transactions which occur with respect to these credit card as are known in the art. An investment partner 146 may be a financial institution with which operators of price protection system have an account, such that funds may be deposited in the account and interest earned on these funds. These accounts may include trust accounts where funds from users of price protection system 120 may be held in trust.

Financial institution 140 may be a large financial institution which may be capable of assuming a large degree of risk, providing insurance against retail price fluctuations, analyzing forward markets, creating price protection contracts or providing any other of a number of desired activities (as will be discussed in more detail below). Thus, in some embodiments financial institution 140 may be a relatively large or well capitalized financial institution such as Goldman Sachs or Morgan Stanley.

External information sources 142 may comprise any number of various source, online or otherwise, which may provide desired data, for example data regarding commodities, markets, locale(s), etc. To illustrate but one example, the website www.gasbuddy.com may be an external information source which provides information pertaining to spotted fuel prices. Identification mechanism company 150 may be a company which provides identification or payment mechanisms (for example cards or the like) to users of price protection system 120 and may assist in processing transactions conducted using these identification mechanisms.

Retail point of sale locations 160 may be locations where a commodity is sold at retail to a consumer. Retail point of sale locations 160 may be associated with operators of price protection system 160 such that consumers may be able to purchase the commodity at a retail point of sale location 160 and the benefit of any price protection contracts for price protection obtained through price protection system 120 realized.

In addition to being associated with price protection system 120, certain retail point of sale locations 160 may be affiliated with operators of price protection system 160, where this affiliation may comprise an agreement between operators of price protection system 120 and the affiliated retail point of sale location 160. For example, the agreement could stipulate that an affiliated retail point of sale 160 will provide a discount on the price of a commodity to operators of price protection system or that the retail point of sale location 160 will pays a fee to be affiliated with price protection system 160, etc.

It should be noted here that not all of the various entities depicted in topology 100 are necessary, or even desired, in embodiments of the present invention, and that certain of the functionality described with respect to the entities depicted in topology 100 may be combined into a single entity (e.g. financial institution 140 may perform the functionality associated with investment partner 148) or eliminated altogether. Topology 100 is therefore exemplary only and should in no way be taken as imposing any limitations on embodiments of the present invention.

Before delving into the details of various embodiments of the present invention it may be helpful to give an overview of an embodiment the present invention with respect to the above described embodiment of a topology, again using the example commodity of fuel. Fleet managers desiring to obtain protection from future increases in the retail price of fuel, or to increase predictability of future fuel costs, may access price protection system 120 to obtain price protection contracts pertaining to fuel. More specifically, in one embodiment, a fleet manager may access price protection system 120 on computing device 110 using a set of interfaces provided by price protection system 120 in order to provide a set of inputs regarding desired price protection to price protection system 120. Using these inputs, price protection system 120 may utilize financial institution 140 to determine a financial institution strike price and an associated insurance cost (e.g. hedge cost per gallon or HCPG), such that by paying the insurance cost to the financial institution the operators of price protection system 20 will be indemnified for any cost of fuel above the financial institution strike price. Note that the quantity measurement of gallons is included in abbreviation HCPG. It will be realized, however, that the concept represented by this abbreviation (e.g. an insurance cost associated with a measure of quantity) may be extended to cover almost any measure of quantity (e.g. liters, pints, quarts, grams, ounces, pounds, tons, cubits, etc.) and thus HCPG may be taken in its general meaning when used in certain contexts herein. Likewise all references to measures of quantity herein may be similarly taken.

A numerical example may be helpful here: if the financial institution strike price is $3.00 per gallon and the HCPG is $0.15, by paying the financial institution $0.15 per gallon of fuel desired the financial institution agrees to reimburse the operators of price protection system 120 for any amount paid for fuel over the $3.00 per gallon financial institution strike price (up to the number of gallons of fuel for which the HCPG was paid).

Using the financial strike price obtained from financial institution 140 then, price protection system 120 may present the fleet manager with a price protection contract specifying at least one lock price, quantity, locale, fuel grade or time period, which the fleet manager can obtain if he desires. By obtaining this price protection contract the fleet manager guarantees the right to purchase the quantity of the specified grade of fuel at the lock price at a number of retail point of sale locations 160 provided that the fuel is purchased in the specified locale. By the same token, however, the fleet manager is under no obligation to purchase the quantity of fuel specified by this price protection contract.

Once the price protection contract is obtained by the fleet manager, price protection system 120 establishes a virtual reserve corresponding to the lock price and quantity of the price protection contract (e.g. which may stored in data storage 122) and one or more identification mechanisms issued to the fleet manager such that drivers of the fleet may purchase fuel using the identification mechanisms at any one of the associated retail point of sale locations 160. Thereafter, when fuel is purchased from an associated retail point sale location 160 (in the locale) using an identification mechanism if the prevailing retail price at the retail point of sale location 160 is below the lock price the fuel may be purchased at the then prevailing retail price.

If the retail price is above the lock price (or the lock price plus some price tolerance), however, the fuel may be purchased at the lock price using the identification mechanism and the amount of fuel purchased subtracted from the virtual reserve (e.g. subtracted from the quantity associated with the virtual reserve) stored at price protection system 120. The retail point of sale location 160 will then be paid by the operators of price protection system 120 for the purchased fuel, where the price for fuel paid by the operators of price protection system 120 to the retail point of sale location 160 may be the same as the prevailing retail price at the retail point of sale location 160 at the time of purchase or otherwise, depending on the agreement between that particular retail point of sale location 160 and the operators of price protection system 120. For each gallon of fuel purchased over the lock price the operators of price protection system 120 may then recoup the difference between the financial institution strike price and the prevailing retail price at the retail point of sale location 160 at the time of purchase.

Another numerical example may be helpful here. Suppose that, as in the above example, the financial institution strike price given to the operators of price protection system 120 by financial institution 140 is $3.00 per gallon. Suppose further now that the lock price provided to the fleet manger is $3.30 per gallon and the prevailing retail price at the retail point of sale location 160 is $3.50 at the time of purchase. As the prevailing retail price at the retail point of sale location 160 ($3.50) is greater than the lock price provided to the fleet manger ($3.30), a driver in the fleet may purchase fuel at the lock price ($3.30) and the quantity of fuel purchased subtracted from the virtual reserve.

The operators of price protection system 120 may then pay the retail point of sale location for the purchased quantity at the prevailing retail price ($3.30), or some lesser or greater amount depending on the agreement between operators of price protection system 120 and retail point of sale location 160. For every gallon of fuel purchased then, the operators of price protection system 120 may recoup the difference between the financial institution strike price ($3.00) and the prevailing retail price at the retail point of sale location at the time of purchase ($3.50) from financial institution 140.

By structuring the provisioning of price protection contracts for price protection to fleet managers or other consumers in the manner discussed above, a number of revenue generation opportunities may be presented to the operators of price protection system 120. First and foremost revenue may be generated by charging a fleet manger a certain amount for the ability to obtain the price protection contract itself. This revenue may originate from a flat fee charged to the fleet manager for the right to purchase a particular price protection contract, where the fee charged may be based on the parameters of the price protection contract. Revenue may also be generated by charging a fleet manager according to the quantity of fuel covered by the price protection contract, for example a lock fee may be charged on a per gallon basis where the lock fee may vary based on the lock price associated with the price protection contract.

Another method to generate revenue is through the inclusion of an insurance premium on the financial institution strike price to obtain the lock price provided to the fleet manger through the price protection contract. In other words, the price protection contract may protect the fleet manager from prices over the lock price while the operators of price protection system 120 may be indemnified by financial institution 140 for any costs over the financial institution lock price. Thus in a scenario where the lock price of the price protection contract is greater (e.g. by an insurance premium) than the financial institution lock price given to the operators of price protection system 120 the difference will accrue to the benefit of the operators of price protection system 120.

Another one of these revenue generation opportunities may be a membership fee charged to those who desire to utilize price protection system 120 to obtain price protection contracts, run analytics, obtain data, consult with one or more financial experts affiliated or provided by operators of price protection system 120, or in general utilize various aspects or functionalities that price protection system 120 provides or makes available. These membership fees may be stratified according to a number of factors, including types of functionality that member desires to utilize, characteristics of the member such as size, locale, previous price protection contracts obtained, consumption of fuel, etc. Thus the functionality made available by price protection system 120 to the fleet manger or the type of price protection contracts (e.g. quantity, lock price, locale, etc.) available to the fleet manager may vary depending on the membership fee paid.

Similarly, revenue may be generated by operators of price protection system 120 by earning interest on various monetary transactions that occur during the obtainment and exercise of price protection contracts by fleet managers. For example, a fleet manager may pre-pay operators of price protection system 120 a certain amount at the time of obtaining a price protection contract. This pre-payment amount may be payment for a percentage of the quantity of fuel covered by the price protection contract at the lock price associated with the price protection contract. To illustrate: if a price protection contract covers 1000 gallons of fuel at $3.00 gallon a fleet manager may pre-pay $3,000 to cover all future anticipated purchases of fuel under the price protection contract. This pre-payment may be used by operators of price protection system 120 to pay retail point of sale location 160 for purchases of fuel under the price protection contract during the time period. At the end of the time period covered by the price protection contract if portions of this pre-payment amount remain unused (i.e. less fuel has been purchased in the time period than was covered by the pre-payment) the amount of this unused pre-payment remaining may be refunded to the fleet manager or used to obtain, or as pre-payment for, another price protection contract. Though this pre-payment may be eventually returned to the fleet manager, put towards another price protection contract or utilized to pay for purchased fuel, in the interim it may be placed in an interest bearing account (for example with investment partner 146) such that any interest that accrues on this money may accrue to the benefit of the operators of price protection system 120.

Other methods for generating revenue from embodiments of methods and systems of the present invention may present themselves through the use of one or more affinity point of sale locations 160. More specifically, a subset of associated retail point of sale locations 160 may be designated as affinity or affiliated retail point of sale locations. Each of these affinity retail point of sale locations 160 may pay an affinity fee in order to be affiliated with price protection system 120 such that these affinity fees are a source of revenue for operators of price protection system 120.

Alternatively, or in addition to, such affinity fees an affinity retail point of sale location may provide an affinity push commission to operators of price protection system 120. This affinity push commission may comprise a discount from the prevailing retail price such that when operators of price protection system 120 pay for fuel purchased at an affinity retail pint of sale location they pay some amount less than the prevailing retail price at the time the fuel was purchased. As the operator of price protection system 120 is indemnified by financial institution 140 against any price over a financial institution strike price, any difference between the prevailing retail price and the price paid to the affinity point of sale location may represent revenue.

Put differently, when a driver (e.g. a fleet driver) purchases a quantity fuel from a retail point of sale location 160 and the retail price of the fuel at the time of purchase is above the lock price for his fleet (or the lock price plus a tolerance), fuel may be purchased from the retail point of sale location 160 and the quantity purchased docked from the fleets virtual reserve. The operators of price protection system 120 then pay the retail point of sale location 160 the cost of the fuel corresponding to the purchased quantity (e.g. at the then prevailing retail price). As the operators of price protection system 120 are indemnified against prices over the financial institution strike price, the operators of price protection system 120 may recoup any difference between the prevailing retail price for fuel and the financial institution strike price. If the retail point of sale location 160 is affiliated with price protection system 120 and is providing an affinity push commission by reducing the price for fuel charged to the operators of price protection system 120, the operators of price protection system 120 may gain revenue in the amount of the difference between the retail price and the reduced price charged to operators of price protection system 120 by the affinity point of sale location.

Revenue may also be generated by operators of price protection system 120 through the monetization of the community surrounding and interacting with price protection system 120 or operators of price protection system 120, for example through the advertising and cross-selling of related products to fleet managers and others accessing price protection system 20 through computing devices 110 (e.g. advertising on web pages or interfaces provided by price protection system 120) or other means.

In certain instances revenue may be generated by leveraging the price protection contracts purchased by fleet mangers. These revenue generation mechanisms may include a buyout or buyback of a price protection contract obtained by a fleet manger, where the buyout or buyback is financially advantageous to the operator of price protection system 120, or brokering a transaction by which a third-party (such as another fleet manager or financial institution 140) buy a price protection contract obtained by the fleet manager through price protection system 120 and charging a broker fee for arranging this transaction. As the federal Securities and Exchange Commission (SEC) may have certain regulations governing the selling or brokering of these types of price protection contracts certain of these revenue generation mechanisms may be mainly available in certain contexts, for example when the holder of the price protection contract is a commercial entity, etc.

Many other opportunities to generate revenue may present themselves to operators of price protection system 120 including licensing of intellectual property obtained or created by operators of price protection system 120, selling or licensing of data obtained, created, aggregated or otherwise produced by price protection system 120 or operators of price protection system 120, providing fee based consultation services (either via computing device 110, in person, via telephone, etc.), or via any number of revenue generation opportunities not discussed herein.

Embodiments of the present invention will now be explained in more detail with reference to FIG. 2 which depicts a flow diagram for one embodiment of a method for the provisioning of price protection contracts which provide price protection with respect to commodity purchasing. At step 210 a fleet manager accessing price protection system 120 may provide a set of inputs regarding future anticipated fuel consumption, where these inputs may include an anticipated quantity of fuel which may be purchased, a time period over which the fuel is to be purchased, the grade or type of fuel to be purchases (e.g. premium, diesel, etc.) and the locale(s) where this fuel is to be purchased. Based upon these inputs delineating the fuel needs of a fleet manger a projection of estimated fuel costs may be determined for the fleet manager by price protection system 120 at step 220. After viewing these estimated or projected fuel costs, the fleet manager may desire to obtain a price protection contract providing price protection for future purchases of fuel and may therefore supply inputs pertaining to a desired price protection at step 230, where these inputs include at least one quantity and locale and may include a whole host of other variables.

Based upon these parameters, price protection system 120 may determine one or more possible price protection contracts for the fleet manager where the price protection contracts comprise at least one quantity, lock price, fuel grade, time period or locale at step 240. At step 250 price protection system 120 may determine a projected fuel cost associated with each price protection contract such that the price protection contracts and associated projected fuel cost associated with each price protection contract may be presented to the fleet manager by price protection system 120.

After viewing the price protection contract(s) presented and the associated projected fuel costs a fleet manager may choose to modify the input parameters for a desired price protection at step 260 (after which new price protection contract(s) and associated projected costs may be determined at steps 240 and 250) or may choose to obtain one or more of the presented price protection contracts and remit any payments associated with the price protection contract at step 270. An account for the fleet manager may then be established if one does already exist and a virtual reserve corresponding to each of the price protection contracts obtained by the fleet manager established at step 280. An identification mechanism (e.g. one or more cards or the like) tied to the account may be issued to the fleet manager at step 290 such that purchases of fuel may be made using these identification mechanisms at step 292. These fuel purchase transactions may then be processed at step 294. A variety of data gathered in conjunction with these transactions may be stored in data storage 122 or reported to a financial institution at step 296.

Figure 2:
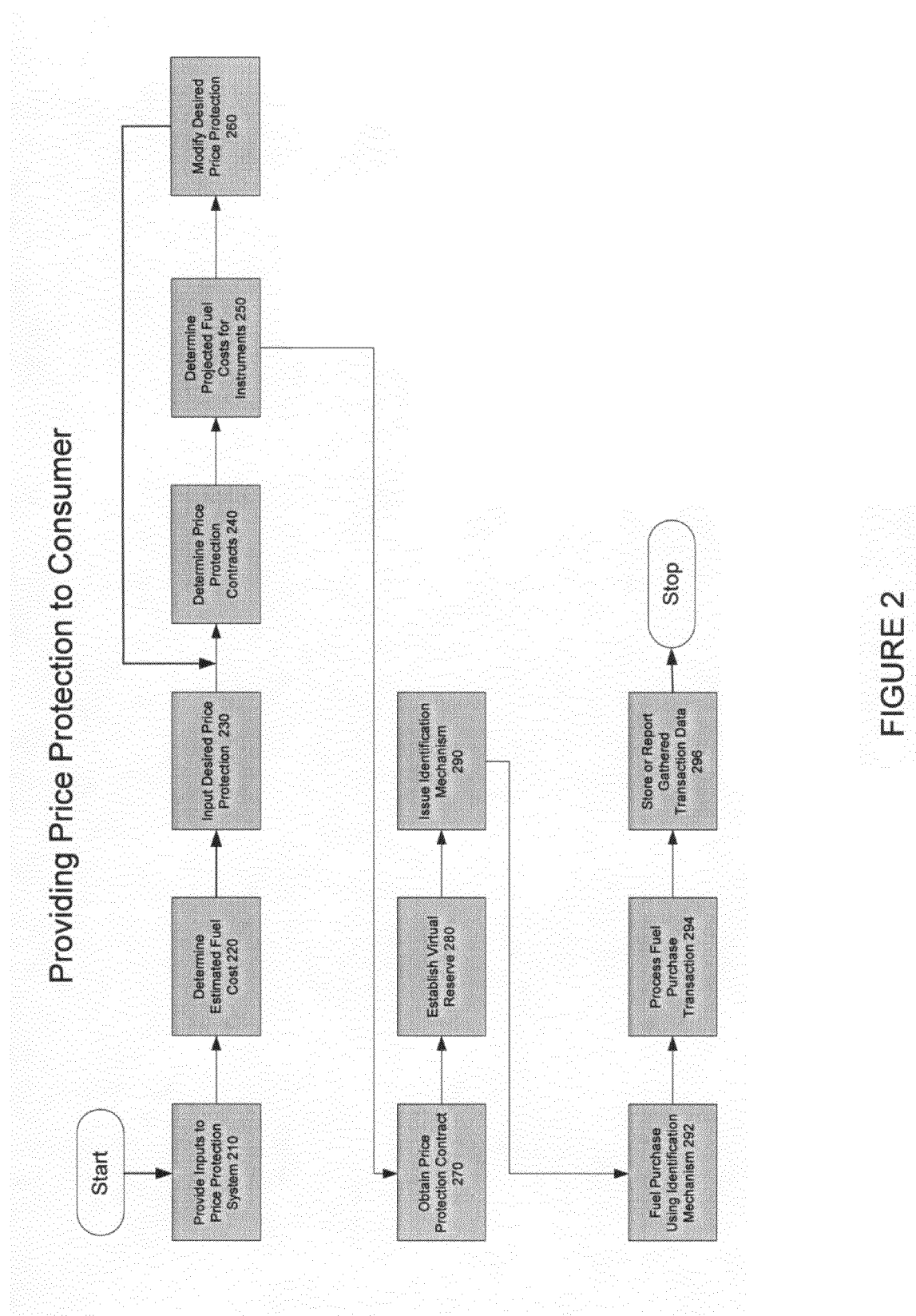
FIG. 2 is a flow diagram illustrating one embodiment of a method for the provisioning of price protection contracts for price protection pertaining to fuel.

Embodiments for methods for accomplishing various steps of FIG. 2 will now be elaborated upon to assist in an understanding of embodiments of the present invention. Before elaborating on these various steps however, it may be useful to present some other information which may apply to some embodiments of the present invention.

As discussed above control and prediction of fuel costs may be of grave concern to businesses and fleet managers. Fleet managers may therefore wish to analyze past fuel consumption costs and predict or analyze future fuel consumption. Embodiments of the present invention may therefore provide analytics to assist a fleet manager, including the ability to calculate an estimated future fuel cost for a time period based on a set of variables provided by the fleet manager or historical fuel consumption of the fleet. These estimated fuel costs may be broken down according to a variety of variables such as locale or time period, such that the fleet manager may be better able to analyze these expected consumption projections.

Additionally, embodiments of the present invention may provide analytics which allow a fleet manager to better predict future fuel consumption and associated costs by providing estimated costs and associated estimated cost savings (e.g. relative to one or more other predicted future fuel cost) for the various price protection contracts presented, along with estimated past cost savings (e.g. determined based upon historical consumption data for the fleet) which might have been realized if one or more presented price protection contracts (or similar types of price protection contracts) had been utilized by the fleet during a historical time period. These future and historical estimates may be updated dynamically and presented to a fleet manager when the fleet manager accesses price protection system 120. For example, a running calculation may be kept of current savings resulting from the fleet manager's selection of a particular price protection contract for price protection.

Figure 3:
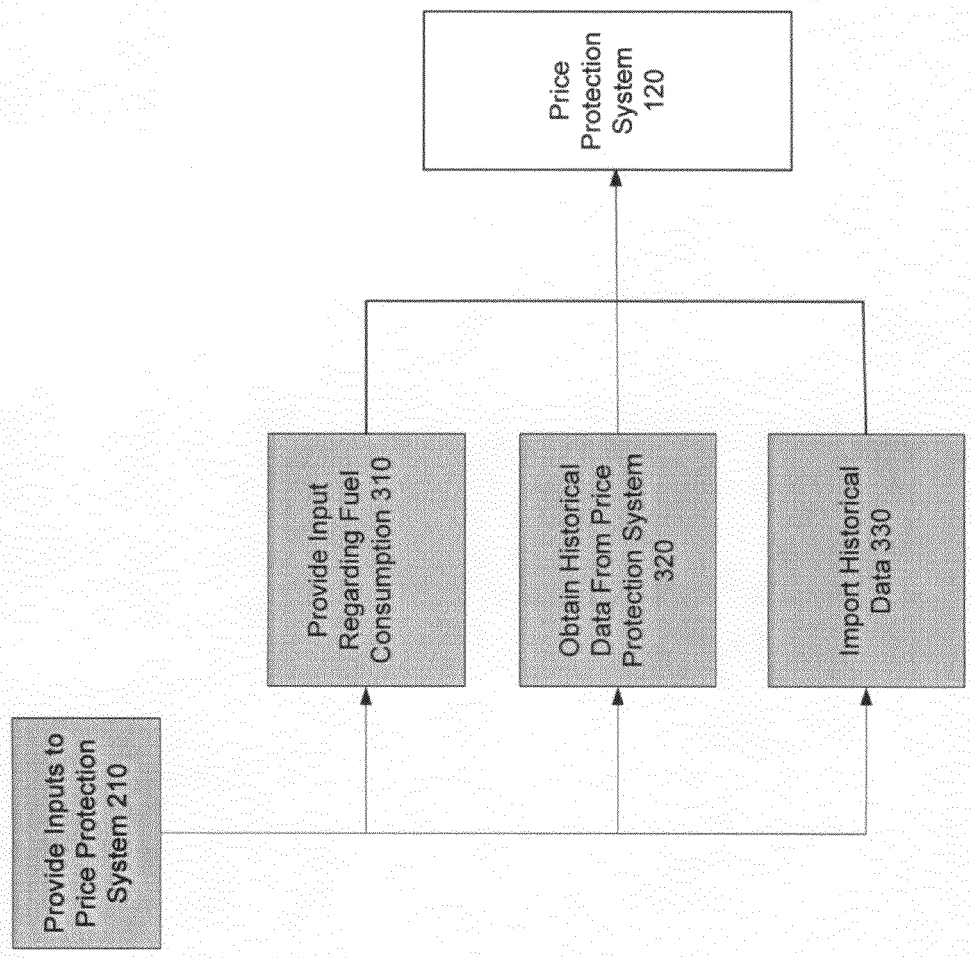
FIG. 3 is a flow diagram illustrating one embodiment of a method for providing inputs regarding fuel consumption.

To utilize these analytics therefore a fleet manger may provide a set of inputs regarding future anticipated fuel to price protection system 120 at step 110. A flow diagram for one embodiment of providing the set of inputs is depicted in FIG. 3. While these inputs may be provided from almost any source, in one embodiment these inputs are usually provided by, or obtained from, three main sources. A fleet manger may input data to price protection system 120 directly at step 310 where this data may include time period over which the fuel is to be purchased, a quantity of fuel which it is to be purchased over the time period, the grade of fuel (e.g. premium, diesel, regular, etc.) and one or more locale(s) where the fuel is to be purchased. While any level of detail may be provided by the fleet manager, in order to facilitate the application of various analytics provided by price protection system 120 the fleet manager may be encouraged to provide the inputs at the finest level of granularity possible. Thus, while the anticipated fuel purchase and associated time period over which the fuel will be purchased may be provided in terms of gallons per years the fleet manager may be encouraged to provide anticipated fuel purchases on a per week or per month basis.

Similarly, it may help to refine the locale(s) in which the anticipated fuel will be purchased to a fairly fine level of resolution. While a locale may be any way of defining a geographic area of interest (including but not limited to countries, states, cities, metropolitan areas, zip codes, counties, area codes, designated market area (DMA), which may be any area where a consumer may receive similar offerings or prices, etc.) instead of providing anticipated fuel purchases locale(s) on the state by state level, it may be desirable to have a fleet manager provide anticipated fuel purchase locales on a city by city level, a county by county basis, a designated market area (DMA) by DMA basis, or a zip code by zip code basis. In other words, it may be desirable to have a fleet manager provide weekly anticipated fuel purchase estimates, with these estimates further broken down such that the anticipated amount of fuel to be purchased every week is broken down even further to anticipate where this fuel will be purchased on a county by county or DMA by DMA basis basis.

Of course the fleet manager may not have this information readily available, or this information may be difficult to ascertain. Consequently, if the fleet manager already has an account established with price protection system 120 actual historical data from this account (e.g. data collected on fuel purchases associated with this account) regarding fuel consumption may be used in lieu of, or to supplement, the data input by the fleet manager. More specifically, in one embodiment, at step 320 actual historical data may be obtained from historical fuel purchase data associated with the fleet manager's account (e.g. stored in data store 122), and future fuel purchase estimates (e.g. quantities, locale(s), grades or time periods) extrapolated from this historical data.

In another embodiment, historical fuel purchase data may be obtained from records kept by the fleet manager or another source at step 330 and used to estimate future fuel purchases. This type of historical fuel purchase data may be, for example, imported to price protection system 120 from one or more accounting programs utilized by a fleet manager such as QuickBooks or the like.

Figure 4:
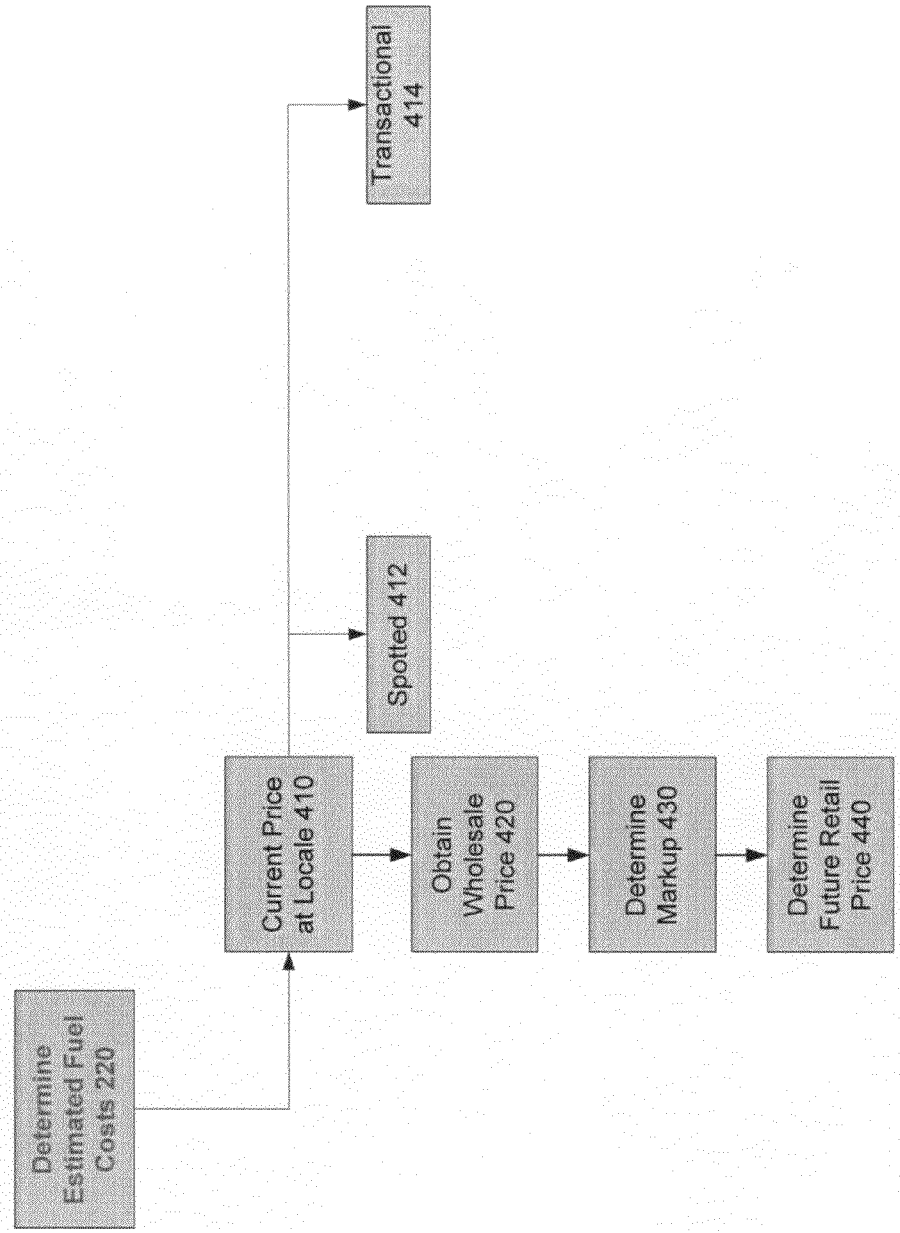
FIG. 4 is a flow diagram illustrating one embodiment of a method for determining estimated fuel costs for a time period.

Once inputs regarding future fuel purchases are obtained (e.g. input, extrapolated or otherwise obtained) at step 210 these inputs may be used to determine an estimated fuel cost at step 220. FIG. 4 depicts a flow diagram for one embodiment of a method for determining estimated fuel costs. At step 410 the current retail price for the desired grade of fuel at one or more of the specified locale(s) (e.g. at step 210) may be determined based on a set of spotted prices 412 and a set of transactional prices 414.

Spotted prices 412 may comprise prices reported at one or more retail point of sale location (which may or may not be associated retail point of sale locations 170) in the locale of interest and may be obtained from a variety of different sources such as gasbuddy.com, fuelwatchers.com, proprietary spotters which report spotted prices directly to price protection system 120 (e.g. through an interface provided by price protection system 120), a real time data feed to price protection system 120 from one or more retail point of sale locations 160 in the locale, etc. These spotted prices 412 may be refined using a set of algorithms which may take into account factors such as the age of the spotted price, the reliability of the source of the spotted price, assumptions on the dynamic variability of fuel prices, etc. to determine a final set of spotted prices to be utilized in determining a current retail price in the locale of interest.

Transactional prices 414 may comprise prices at which fuel was actually purchased and may also be obtained from a variety of sources such as credit card company 150, associated retail point of sale locations 160, transactions processed by price protection system 120, etc. These transactional prices may likewise be refined to a set of final transactional prices using algorithms which take into account various factors like age of the transactional price, source, volume of fuel purchased, etc. or which may perform statistical analysis techniques on the transactional prices.

Using these spotted and transactional prices then a current retail price at the locale of interest may be determined. In one embodiment, the price at the locale of interest may be determined by aggregating final spotted price data and final transactional price data for the same retail point of sale locations 160 (if available) to determine a current retail fuel price on a retail point of sale location by retail point of sale location basis. This may entail an evaluation or comparison between a spotted retail price for a retail point of sale location and a transactional price for the retail point of sale location. For example, one of the spotted prices may be chosen if it is more recent in time than the last transactional price associated with the retail point of sale location 160, otherwise the transactional price may be selected as the current retail price for that retail point of sale location 160. These current retail prices for a set of retail point of sale locations 160 can then be aggregated, averaged, or combined using some other statistical methodology, to obtain a current aggregated retail composite price for the locale. This current aggregated retail composite price for the locale may then be adjusted based on a confidence level if desired.

Once a current aggregated retail composite price is determined for each locale of interest the anticipated wholesale price for fuel for the time period of interest may be obtained at step 420. In one embodiment, a matrix of future wholesale prices associated with different time periods (e.g. a price of $2.50 for the next week, a price of $2.60 for the next month, etc.) may be provided or obtained from financial institution 140 by price protection system 120 or from another source such as a mercantile market like the New York Mercantile Exchange (NYMEX).

A markup associated with the locale may then be determined at step 430 using the current aggregated retail composite price calculated for the locale. A retail price for fuel may comprise a number of components, including a wholesale price for fuel, a rack rate markup, a retail markup or a tax component. Thus, utilizing data regarding the locale of interest (e.g. tax data, current wholesale price of fuel in the locale etc.) a markup associated with the locale of interest may be algorithmically determined or predicted.

Using the markup corresponding to the locale of interest determined at step 430, the anticipated wholesale price of fuel for the time period of interest determined at step 420 and the current aggregated retail composite price calculated at step 410, a future retail price for fuel in the locale of interest may be calculated at step 440 and, in turn, this future retail price of fuel used to calculate anticipated fuel costs corresponding to the input variables obtained at step 210.

More particularly, based upon the current aggregated retail composite price a current wholesale price for the locale(s) and fuel grade of interest may be determined by subtracting the markup determined at step 430 from the aggregated composite retail price determined at step 410. An estimated change in prices may then be determined based upon the anticipated wholesale price determined at step 420 and, using the current aggregated retail composite price determined at step 430, a future wholesale price for the locale(s) and grade of interest determined.

This calculation may take into account that wholesale prices may fluctuate during the time period of interest, and thus a future wholesale price may be calculated using a finer granularity of time periods than the time period of interest. For example, if the time period of interest for which an estimated fuel cost is to be calculated is six months, a future wholesale price may be calculated for a number of steps corresponding to time periods within the six months, a step may correspond to a week, a month, etc. These future wholesale prices calculated for each of these steps may then be algorithmically aggregated to form a total future wholesale price for the time period of interest. The markup estimated at step 420 may then be added to this total future wholesale price to establish an estimated future retail price. Using this future retail price, then, an anticipated fuel cost may be calculated at step 220 based on the quantity, locale(s), grade, and time periods of interest. This anticipated fuel cost may then be adjusted by any of a number of factors including weather data, historical events, etc. and presented to the fleet manager by price protection system 120.

After perusing these anticipated future fuel costs a fleet manager may wish to obtain a price protection contract such that he will be protected against future fluctuations in the price of fuel. The fleet manager may, however, wish to obtain price protection contracts that cover time periods, grades, locales or quantities different than those for which an anticipated future fuel cost was calculated (as described above with respect to step 220). To obtain desired price protection contracts then, the fleet manager may provide a number of variables to price protection system 120 in order to define the boundaries of his desired protection at step 230.

Figure 5:
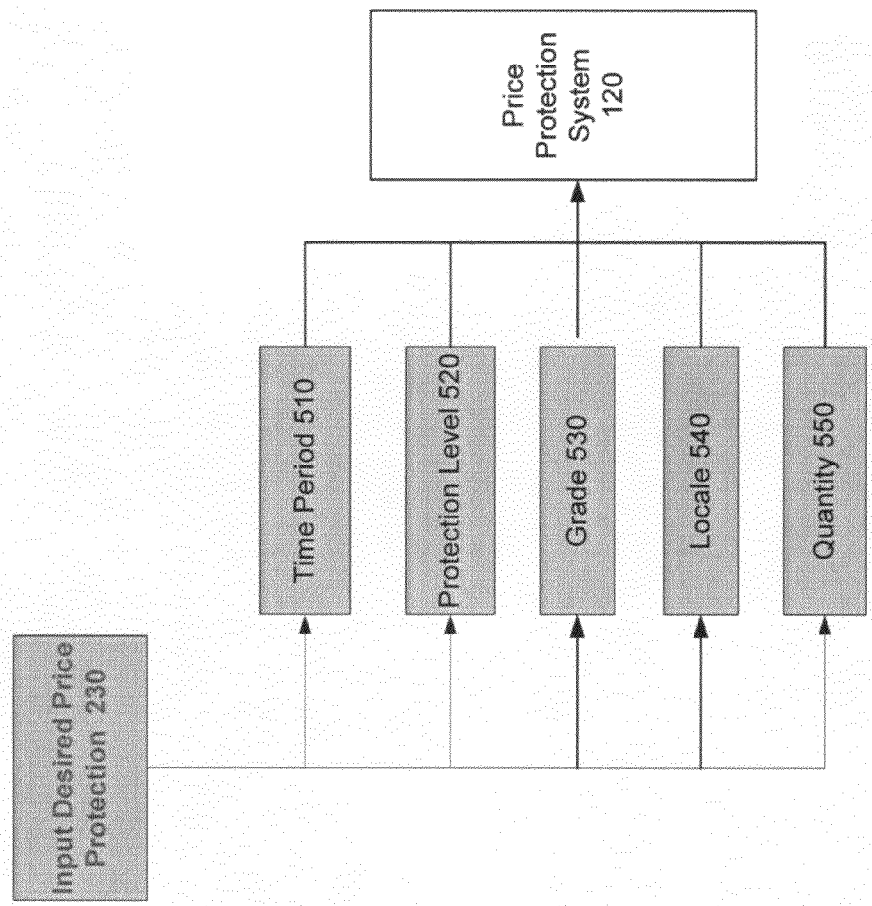
FIG. 5 is a flow diagram illustrating one embodiment of a method for providing inputs regarding price protection.

Moving briefly to FIG. 5, a flow diagram for one embodiment of providing input variables regarding desired price protection is depicted. In step 230 a fleet manager at computing device 110 may provide to price protection system 120 a number of variables corresponding to price protections which the fleet manager desires to obtain. These variables may include a desired time period over which the price protection should extend at step 510, a desired level of protection, for example whether unlimited or partial price protection is desired (e.g. whether any amount over a lock price would be covered or only a partial amount over the lock price) at step 520, a grade of fuel desired at step 530, locale(s) for the price protection at step 540, quantity of fuel to be covered by the price protection at step 550, a starting price point for price protection, etc.

In one embodiment, the variables for desired price protection may be obtained using the variables corresponding to the future fuel consumption provided by the fleet manager at step 210 or the fleet manger may select from a set of pre-defined risk profiles or desired price protections presented to the fleet manager by price protection system 120. These risk profiles may comprise commonly desired or obtained quantities or protections. Alternatively, a fleet manager may be presented with a set of questions by price protection system 120, the answers to which may be evaluated to determine a set of price protection packages to be presented to the fleet manager.

Based upon the desired price protection variables provided by the fleet manager at step 210 price protection system 120 determine one or more price protection contracts at step 240 and corresponding anticipated costs of fuel associated with these price protection contracts at step 250, both of which may then be presented to the fleet manager. These price protection contracts may comprise one or more locale(s), grades, quantities, associated lock prices or time periods. Thus, in order to determine these price protection contracts at step 240 it is first desired to determine the one or more lock prices associated with the price protection contracts.

Figure 6:
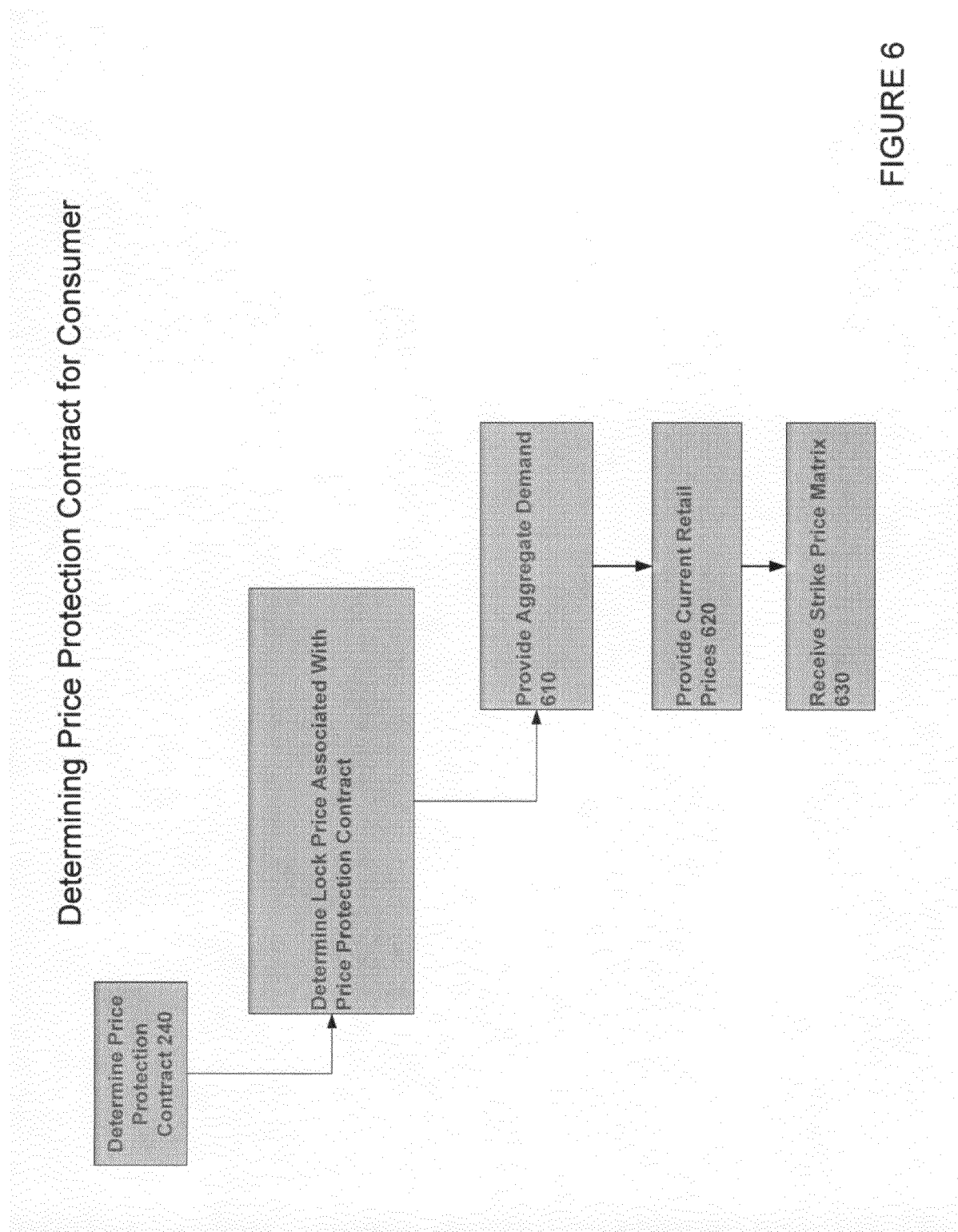
FIG. 6 is a flow diagram illustrating one embodiment of a method for the determination of price protection contracts.

Turning to FIG. 6 a flow diagram for one embodiment of determining one or more lock prices associated with a price protection contract is depicted. At step 610, on a regular or semi-regular basis, such as hourly, daily, monthly, etc. price protection system 120 may provide to financial institution 140 an aggregated demand for price protection using the types of price protection contracts provided through price protection system 120. This aggregated demand may comprise both actual demand obtained from interactions with price protection system 120 or anticipated demand which may be derived from interactions with price protection system 120, the future anticipated prices of fuel, information from external source 142 or almost any of a number of variables or other information.

As price protection system 120 may interact with a large and diversified customer base, in one embodiment, what is provided to financial institution 140 by price protection system 120 at step 610 is a dynamic, nationwide, time diversified portfolio of actually obtained, or anticipated demand for, price protection price protection contracts where each of the price protection contracts may individually be associated with a quantity of a specific grade of fuel, one or more lock prices, one or more locales and one or more time periods.

In addition to this aggregated demand for price protection provided to financial institution 140 at step 610, price protection system 120 may also provide current retail prices of fuel at step 620, wherein the retail prices may be locale based (e.g. provided on a county by county, DMA by DMA or zip code by zip code basis, etc.) or provided on a grade by grade basis. Price protection system 120 may also provide locale based wholesale prices to financial institution 140 or almost any other inputs desired, such as those obtained from external information sources 142 or calculated by price protection system 120.

Financial institution 140 may process the inputs provided by price protection system 120 to assess the risk of the aggregated demand such that the financial institution can price the risk. Using the determined price of the risk the financial institution 140 may provide a matrix of financial institution strike prices to price protection system 120 at step 630. This matrix may be provided at regular time intervals such as an hourly or daily basis, where the time interval at which the matrix of financial institution strike prices is provided from financial institution 140 to price protection system 120 may be completely independent of the time interval at which inputs are provided from price protection system 120 to financial institution 140.

The financial institution strike price matrix may comprise a set of locales, time periods, fuel grades and financial institution strike prices such that a particular HCPG is associated with a particular locale, time period or duration, fuel grade and strike price. The locales may, for example, be counties, DMAs, zip codes, school districts, etc. such that each of the locales is substantially discrete from one another.

Figure 7:
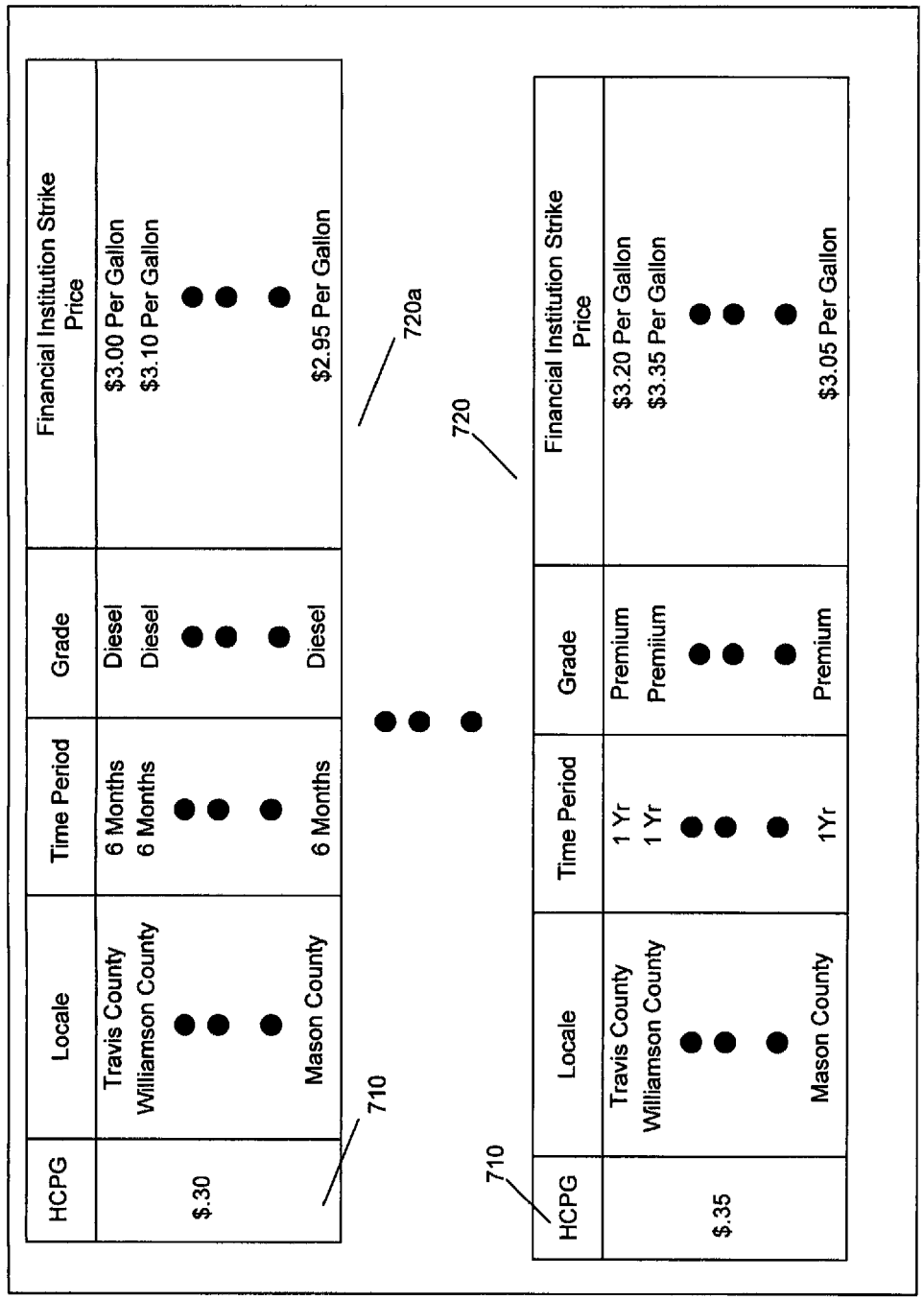
FIG. 7 is a representation of one embodiment of a financial institution strike price matrix.

FIG. 7 depicts a representation of one embodiment of a portion of a financial institution strike price matrix. Here, a financial institution strike price matrix 700 comprises a set of price decks 720 where an HCPG 710 is associated with a corresponding price deck 720 and wherein a price deck 720 comprises a set of individual locales (e.g. each county, DMA, zip code in the United States). Each of the individual locales of a price deck 720 is, in turn, associated with a time period, a fuel grade and a per gallon financial institution strike price, whereby if operators of price protection system 120 pay the financial institution 140 the HCPG 710 they may be indemnified for any price above any of the financial institution strike prices in a corresponding price deck 720 provided that the fuel is of the associated grade and is purchased in the locale associated with the financial institution strike price within the associated time period.

For example, with respect to price deck 720*a*, if operators of price protection system 120 pay a HCPG of $0.30, for a certain quantity of fuel, they may obtain the right to be indemnified by financial institution 140 for any amount over $3.00 spent on a gallon of diesel fuel purchased in Travis County during the next 6 months, any amount over $3.10 spent on a gallon of diesel fuel purchased in Williamson County during the next 6 months, etc. up to the quantity of fuel for which the HCPG was paid. It will be appreciated that the above embodiment is exemplary only, and that a wide variety of other configurations and formats for financial institution strike price matrices may be utilized without loss of generality.

While financial institution 140 offers to indemnify the operators of price protection system 120 for prices above a certain financial institution strike price based upon a HCPG, financial institution 140 may itself utilize a variety of mechanisms to account for the risk it is taking on by providing this indemnification to price protection system 120. For example, while financial institution 140 could warehouse the risk themselves (e.g. assume all risk for future price fluctuations), in certain cases financial institution 140 may lay off the risk of increases in the wholesale price or retail price of fuel by purchasing other forward contracts in mercantile or other markets such as the New York Mercantile Exchange (NYMEX), or by securitizing the retail price risk and laying off the risk to the public market through these securities. In fact, in many instances the provisioning of financial institution strike prices and HCPG combined with the securitizing or offsetting of this risk in other markets may present a significant financial opportunity to financial institution 140. Thus, in some embodiments, financial institution 140 may pay a fee to the operators of price protection system 120 for the data corresponding to the aggregated data provided by price protection system 120 at step 610 or other data provided by price protection system 120.

Returning to FIG. 6, once the financial institution strike price matrix is received by price protection system 120, price protection system 120 may use the variables corresponding to the desired price protection input by the fleet manager at step 230 and the financial institution strike price matrix to determine a set of price protection contracts to present to the fleet manager at step 240. These price protection contracts may comprise a fuel grade, time period and a set of locales, where each of the locales (or groups of locales) may have a lock price or a quantity associated with it.

The lock prices associated with the locales may be determined in a variety of ways, including adding a markup to a financial institution strike price corresponding to the locale (or a markup to the financial institution strike price plus the associated HCPG), modifying the financial institution strike price based on the type of price protection desired by the fleet manger (e.g. full or partial protection), whether the fleet manager agrees to purchase at only affiliated retail point of sale locations 160, etc. By obtaining a particular price protection contract the fleet manager may obtain the right for the time period specified to aggregately purchase the specified quantity of the grade of fuel in each of the locales at the lock price associated with the locales if the retail price of that grade of fuel goes above the associated lock price in the locale.

For example, a particular price protection contract may specify a quantity of 1000 gallons of diesel in Travis and Williamson County for a period of six months at a lock price of $3.50 a gallon. Thus, by obtaining this price protection contract a fleet manager may obtain for six months the right to purchase 1000 gallons of diesel at retail point of sale locations 160 in either Travis or Williamson County for the lock price of $3.50 a gallon if the retail price is above $3.50 per gallon.

In one embodiment, a fleet manager interacting with price protection system 120 may be presented with a map segmented by locale, with each locale of interest associated with a lock price for a grade of fuel (e.g. the area of the map corresponding to each locale of interest may be color coded according to an associated lock price). Each of the price protection contracts may then be presented to the fleet manager as a quantity and time period and an associated obtainment cost, such that by paying the obtainment cost a fleet manger may obtain the right to purchase the quantity of fuel associated with the price protection contract aggregately in all of the locales and where if the retail price of fuel in a locale is above the lock price corresponding to that locale fuel may be purchased at the lock price corresponding to that locale while otherwise fuel may be purchased at the prevailing retail price.

In addition to presenting the fleet manager with a set of price protection contracts, price protection system 120 may also calculate a projected fuel cost corresponding to each of the price protection contracts at step 250 where the projected fuel cost corresponding to a price protection contract may be the anticipated fuel cost for the time period corresponding to the price protection contract if the fleet manger chooses to obtain the price protection contract. This projected fuel cost may also take into account, or be calculated based on, the anticipated fuel consumption input by a fleet manager in step 210. Using these projected fuel costs corresponding to the set of price protection contracts presented to the fleet manager, and the estimated cost of fuel determined at step 220, a cost savings associated with each of the set of price protection contracts may also be determined and presented to the fleet manager in conjunction with the set of price protection contracts.

Referring now back to FIG. 2, after reviewing the set of price protection contracts (and the associated projected fuel costs and cost savings) the fleet manger may choose to obtain information pertaining to other price protection contracts by modifying the parameters for the desired price protection at step 260. The fleet manger may then provide a new set of variables to price protection system 120 at step 240 in order to obtain information on a new set of price protection contracts corresponding to the new set of variables. These new variables may comprise different locale(s), different starting price point for protection, a different grade of fuel, different quantity of fuel, etc.

In one embodiment, a fleet manager may refine his selection of locale(s) using a map presented by price protection system 120. As discussed above, a fleet manager interacting with price protection system 120 may be presented with a map segmented by locale, with each locale of interest associated with a lock price for a grade of fuel (e.g. the area of the map corresponding to each locale of interest may be color coded according to the lock price). By interacting with this type of map a fleet manager may select a subset of the locale(s) for which a price protection contract is desired and a new set of price protection contracts created and displayed to the fleet manager (along with their corresponding projected fuel costs and cost savings).

At some point a fleet manager may choose to obtain one of the price protection contracts presented to him at step 270. As mentioned above, an obtainment cost may be associated with the price protection contracts. Furthermore, operators of price protection system 120 may desire to obtain pre-payment for at least a portion of the quantity of fuel which the fleet manager has the right to buy under the price protection contract (e.g. if the price protection contract gives the right to purchase a thousand gallons of fuel at the lock price $3.00 a gallon it may be desirable to obtain at least a portion of the three thousand dollars). (It will be realized however that while obtaining a pre-payment may be beneficial to providers of a price protection contract, in certain embodiments of the invention this pre-payment amount may also not be obtained.) To that end a variety of options or payment methodologies may be utilized to allow a fleet manager to pay for any costs associated with obtaining a desired price protection contract.

For example, a fleet manger may have an account on price protection system 120 where the account may be associated with a credit card and the cost billed to the credit card. Similarly, a debit card may be used in substantially the same manner. A wire transfer from a fleet manager to a bank account associated with price protection system 120 or operators of price protection system 120 (e.g. an account at investment partner 148) may also be used to pay for any associated costs. In fact, it will be appreciated that almost any form of payment may be utilized to pay for costs associated with obtaining a particular price protection contract.

In one particular embodiment, a loan or line of credit from a financial institution (which may or may not be identical to financial institution 140) may be extended to the entity for which fleet manager is obtaining the price protection contract such that the fleet manager may obtain the price protection contract without any up front payments. This line of credit may be facilitated by the operators of price protection system 120 whereby the operators of price protection system 120 engages with the financial institution, such that consumers can be driven to price protection system 120, or an offer to use price protection system 120 made to the consumer, based upon the financial institutions' analysis of its customer base to identify existing customers of the financial institution with heavy fuel consumption and good existing credit, or the operators of price protection system 120 may refer consumers who desire a line of credit to obtain price protection contracts offered by operators of price protection system 120 to the financial institution.

Thus, in one embodiment, a consumer may be offered a hybrid price protection contract which encompasses both a price protection contract providing price protection, such as that discussed above, coupled with a loan or line of credit from the financial institution. For example, a price protection contract for price protection may be provided to a consumer such that the consumer obtains price protection for 1000 gallons of fuel for a time period of a year at a lock price, where the consumer prepays for 200 gallons at the lock price, while the other ten months may be covered by a loan from the financial institution. The financial institution providing the line of credit to the consumer may pay for the remaining ten months to the operators of price protection system 120 immediately, the operators of price protection system 120 may then sign a full recourse loan to the financial institution, while the consumer pays interest on the ten month loan and is contracted with the financial institution for the loan.

Figure 8:
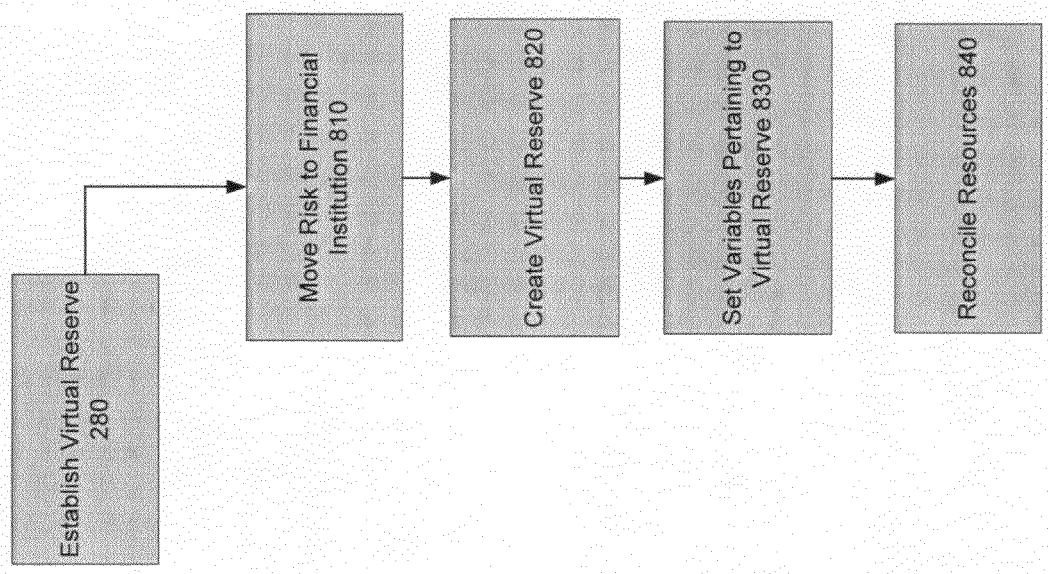
FIG. 8 is a flow diagram illustrating one embodiment of a method for establishing a virtual reserve.

Irrespective of the method used to pay for any costs associated with the obtainment of the price protection contract, once the price protection contract is obtained at step 270, a virtual reserve corresponding to the price protection contract may be established at step 280. A flow diagram for one embodiment of establishing a virtual reserve is depicted in FIG. 8. When a price protection contract is obtained the operators of price protection system 120 may move the "risk" associated with their provisioning of the price protection contract to financial institution 140 at step 810.

More specifically, the price protection contract provided by operators of price protection system 120 may specify a quantity, a locale, a lock price, a time period and a grade of fuel. Thus, by provisioning this price protection contract the operators of price protection system 120 have agreed to reimburse the owner of this price protection contract for any amount paid for fuel over the lock price for any fuel purchased in the locale during the time period up to the specified quantity. To offload the "risk" assumed by the provisioning of this price protection contract (e.g. the possibility that operators of price protection system will have to pay reimbursement under the provided price protection contract), the operators of price protection system 120 may themselves purchase or otherwise obtain a right of indemnification from financial institution 140.

The parameters of the right of indemnification obtained by operators of price protection system 120 from financial institution 140 may depend on a number of factors, including the risk adversity of the operators of price protection system 120 (e.g. how much risk the operators of price protection system 120 wish to take on, etc.). Thus, at least a portion of the risk inherent in the provisioning of a price protection contract may be offset by purchasing the right to be indemnified by financial institution 140 for any amount paid for a specified quantity of a grade of fuel over a financial institution strike price by paying a HCPG to financial institution for the specified quantity.

Referring briefly back to FIG. 7 and the associated description, in one embodiment the parameters of quantity, grade, locale and time period of the indemnification obtained by operators of price protection system 120 from financial institution 140 may correspond to the price protection contract provided by operators of price protection system 120 to the fleet manager, while the financial institution strike price associated with the right of indemnification obtained from financial institution 140 may correspond to the financial institution strike price from which the lock price associated with the price protection contract was calculated.

Again, an example may be helpful, suppose that financial institution strike price matrix 700 is provided to price protection system 120 by financial institution 140. From this financial strike price matrix 700, price protection system 120 may determine a price protection contract comprising price protection for 100 gallons of diesel in Travis County for a period of six months at a lock price of $3.50 per gallon. If the fleet manager decides to obtain this price protection contract, operators of price protection system 120 may obtain a right of indemnification covering the purchase of 100 gallons of diesel in Travis County for six months at a financial institution strike price of $3.00 per gallon from financial institution 140 by paying $300 (e.g. HCPG of $0.30 for 100 gallons). In the next six months then, whenever diesel is purchased by a fleet driver in Travis County at a price above $3.50 the fleet manager may obtain reimbursement for any amount over the $3.50 lock price associated with the obtained price protection contract for each gallon of diesel purchased up to 100 gallons. In turn, operators of price protection system 120 may obtain reimbursement from financial institution for any amount over the $3.00 per gallon financial institution strike price for each gallon of diesel purchased up to 100 gallons.

Returning to FIG. 8, once the operators of price protection system 120 have at moved at least some degree of risk to financial institution 140 at step 810, a virtual reserve corresponding to the obtained instrument is created at step 820. A virtual reserve may have an associated quantity, grade, lock price, time period or one or more locales. For each price protection contract obtained by a fleet manager therefore, at least one virtual reserve may be established where the virtual reserve has a set of variables corresponding to the quantity and lock price of the obtained price protection contract.

More particularly, in one embodiment a fleet or fleet manager may have an account with price protection system 120, where a record of the account is stored in data store 122. A virtual reserve may be a data object stored in data store 122 and associated with the account of a fleet manager such that when a transaction associated with the fleet of the fleet manger is processed (as discussed below) the virtual reserve may be accessed or modified. When a fleet manager accesses an account on price protection system 120 a graphical representation of the virtual reserve may be presented to the fleet manager such that the fleet manger is made visually aware of the amount of fuel which has been purchased at the lock price associated with the corresponding price protection contract and the amount of fuel which he still may buy at that lock price.

Furthermore, at step 830, a fleet manager may set certain variables pertaining to the use of the price protection offered by the price protection contract corresponding to a virtual reserve. One of these variables may be the establishment of one or more price tolerances associated with the virtual reserve. In certain cases, even if fuel is purchased by one of his drivers above the lock price associated with a price protection contract for a variety of reasons the fleet manager may not wish to have the amount of fuel purchased covered under the price protection contract (and subtracted from the quantity associated with the virtual reserve). For example, if a price protection contract offers price protection at a lock price of $3.00 a gallon a fleet manger may not wish to have fuel purchased by a driver at a retail price of $3.01 covered by this price protection contract (and the amount of fuel purchased subtracted from the quantity which may still be purchased under the price protection contract).

To better define when a particular price protection contract is to be applied then, a fleet manager may define a price tolerance to be associated with a virtual reserve when a virtual reserve is established at step 280. This price tolerance may define an amount (which may be a zero value) added to a lock price such that the price protection contract corresponding to the virtual reserve is not applied to cover a fuel purchase unless the retail price at which the fuel is purchased exceeds the lock price of the price protection contract plus the price tolerance. Again assume a price protection contract offers price protection at a lock price $3.00, suppose now, however, that the fleet manager has specified a price tolerance of $0.10 for the virtual reserve corresponding to this price protection contract. In this case, any fuel purchased at $3.01 will not be covered by the price protection contract as the lock price plus the price tolerance ($3.00+$0.10=$3.10) is greater than the retail price at which the fuel was purchased ($3.01).

At step 840 resources (e.g. virtual reserves) associated with the account may then be reconciled if desired. It will be noted from the above description, that an account may have multiple associated virtual reserves, each virtual reserve with its own associated price, quantity, grade, time period and locale(s). Each of these virtual reserves may have been established based upon a single price protection contract obtained by a fleet manager, or may have been established over a period of time through the obtainment of multiple price protection contracts. It will also be noted that the obtainment of a price protection contract may not result in the establishment of a new virtual reserve and may, in some cases, result in the modification of the parameters associated with existing virtual reserves, for example the quantity or lock price of an existing virtual reserve may be modified based upon an obtained price protection contract. Thus, at step 830 the newly established virtual reserve may be reconciled with existing virtual reserves associated with the account and virtual reserves combined or aggregated if desired.

After a virtual reserve is established in step 280, one or more identification mechanisms tied to the account of a fleet manager (and thus associated with the virtual reserves corresponding to the fleet account) may be issued at step 290. In one embodiment, these identification mechanisms may comprise one or more cards such that a fleet manager may distribute these cards to his fleet drivers, and the fuel purchased at retail point of sale location 160 using these cards.

Figure 9:
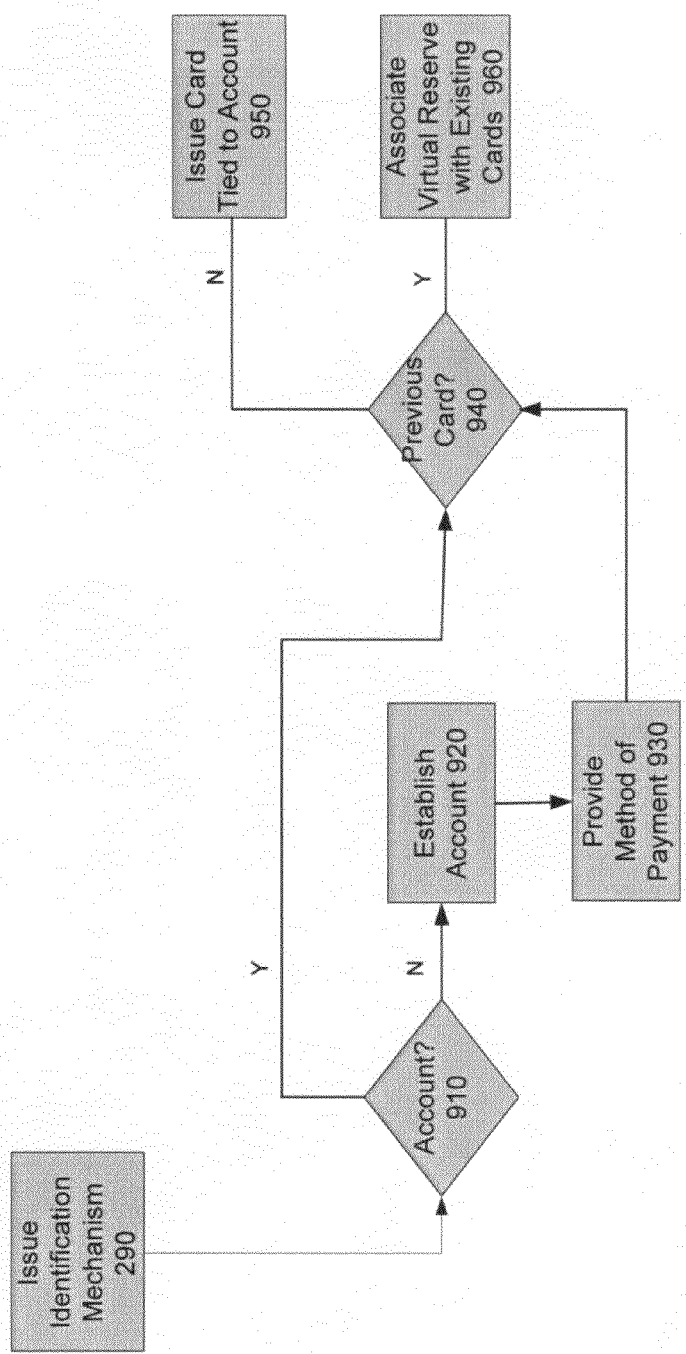
FIG. 9 is a flow diagram illustrating one embodiment of a method for issuing an identification mechanism.

A flow diagram for one embodiment of issuing cards to a consumer is depicted in FIG. 9. At step 910 it may be determined if an account has already been established for the consumer who has obtained the price protection contract in step 270, and if not an account established for the consumer at step 920. To establish an account at step 920 the consumer may provide a method of payment such as a credit card or other form payment, such as a debit card, bank account number or the like, such that the account may be associated with the method of payment.

It can then be determined if previous cards have been issued to the consumer at step 940. If cards have not been issued one or more cards may then be issued and tied to the account at step 950, otherwise the virtual reserves established at step 280 may be tied to already existing cards through the association of the newly established virtual reserve with the account itself at step 960. While the above issuance of a payment methodology has been described with respect to cards it will be apparent that any suitable payment methodology may be used in conjunction with embodiments of the present invention, such as the issuance of specific identification numbers, electronic tags, or almost any other payment methodology which allows the identification of a user of that payment methodology.

Using these cards issued at step 290 (or previously issued) individual consumers or drivers in a fleet associated with a fleet manager may purchase fuel at associated retail point of sale locations 160 at step 292. In some cases it may be desirable to steer card users (e.g. fleet drivers, individual consumers, etc.) to specific associated retail point of sale locations which may provide some advantage to the consumer, the operators of price protection system 120 (as discussed above), or partners of the operators of price protection system 120. This type of steering may be done utilizing an advanced communication mechanism.

More particularly, price protection system 120 may identify affiliated retail point of sale locations 160 (e.g. these affiliated retail point of sale locations may be stored in data store 122) or the retail point of sale location 160 with the current lowest prevailing retail price in a particular locale which may be germane to that card user (e.g. a consumer is currently in that locale, or has a virtual reserve tied to that locale). This identification may be done in a variety of ways, including dynamic analysis of retail prices on a retail point of sale by retail point of sale basis, using a threshold where all retail point of sale locations 160 having a price that falls below this threshold will be communicated to a particular card user, etc. Using a heuristic, the list of affiliated retail point of sale locations 160 or otherwise preferred retail point of sale locations 160 may be aggregated in order to determine a list of associated retail point of sale locations 160 which it is desired to provide to a particular consumer. This list may then be communicated or otherwise made available to a card user (e.g. fleet driver or individual consumer) using any one of a variety of communication methodologies, including instant messaging, email, Internet based communications, phone, fleet management systems, satellite, On-Star, GPS, etc.

As discussed above, steering card users to certain retail point of sale locations (e.g. affinity retail point of sale locations 160) may have revenue implications for operators of price protection system 120. By steering card users to retail point of sale locations with lower prices other advantages may also be obtained. Namely, by steering card users to these lower priced retail point of sale locations 160 future cost savings may be achieved by reducing the HCPG which operators of price protection system 120 pay to financial institution 140.

Thought about differently, the HCPG charged to operators of price protection system 120 is similar to an insurance premium. Thus, the HCPG charged may be actuarially determined based upon historical occurrences and anticipated future occurrences. By steering card users to lower retail price points the number of gallons purchased above the financial institution strike price may be reduced or the price differential between a financial institution strike price and the retail price at the retail point of sale location 160 may likewise be reduced. Taken in aggregate these reductions may cause a commensurate reduction in the monetary remuneration which financial institution 140 pays to operators of price protection system 120 for a number of gallons of fuel purchased above the financial institution strike price (relative to the remuneration paid if no steering function was performed). Of equal importance, however, is that the next time financial institution 140 calculates a financial institution strike price matrix, data corresponding to the amount of remuneration paid by financial institution 140 and the number of gallons on which remuneration was paid may figure into the calculation of the financial institution strike price matrix.

As the reduction in the monetary remuneration which financial institution 140 pays to operators of price protection system 120 for the number of gallons purchased above the financial institution strike price has been reduced (relative to the remuneration paid if no steering function was performed) the HCPG in the financial institution strike price matrix may also reflect this reduction, resulting in a cost savings to the operators of price protection system 120 the next time indemnification is purchased from financial institution 140 by operators of price protection system 120 (again relative to the price which would be paid if no steering function was performed).

Figure 10:
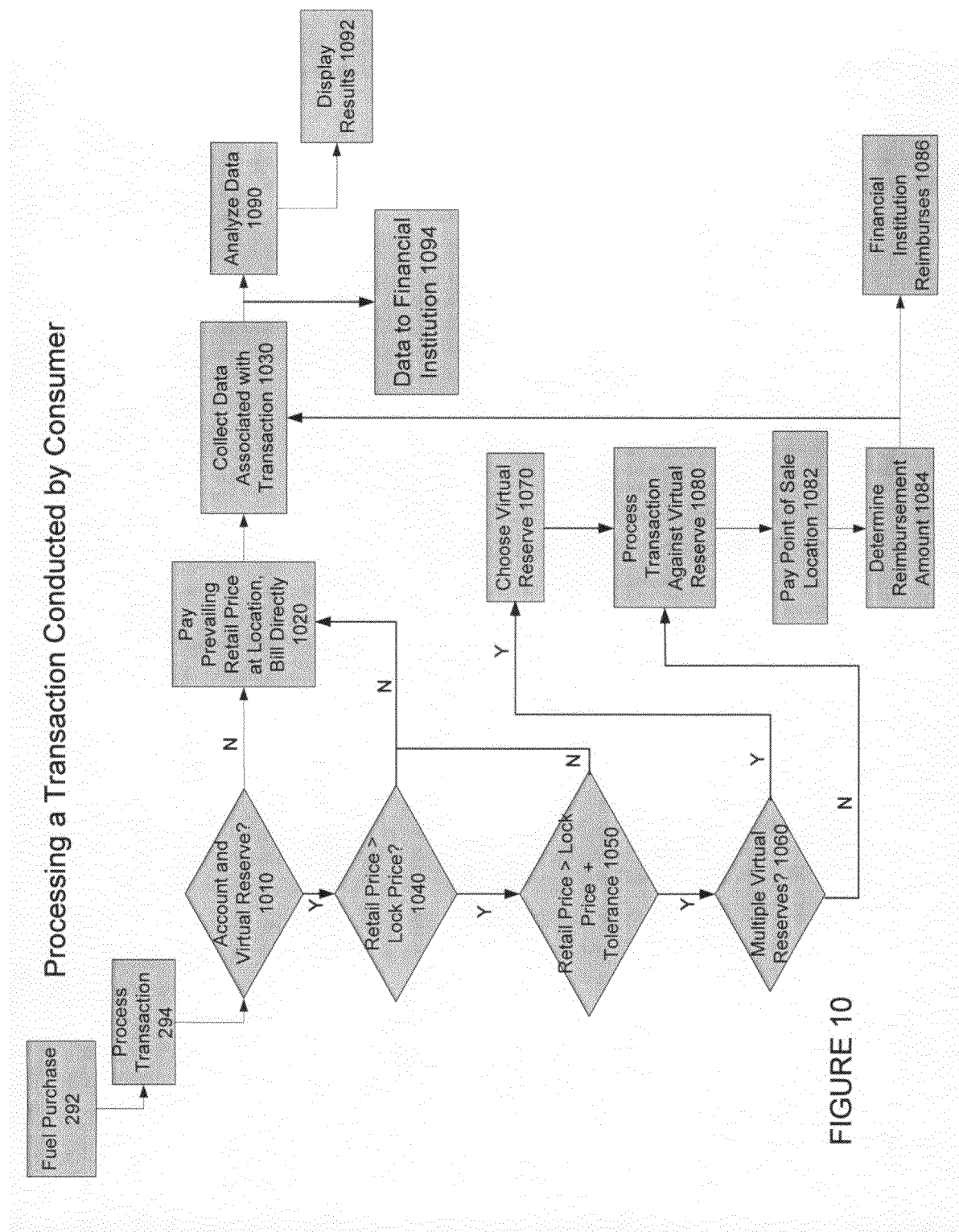
FIG. 10 is a flow diagram illustrating one embodiment of a method for the processing of a transaction.

No matter the associated retail point of sale location 160 used by a card holder, however, when a purchase of fuel is made by a card holder at a point of sale retail location 160 this transaction is processed at step 294. FIG. 10 depicts a flow diagram of one embodiment of processing a transaction. Once a consumer purchases fuel using the card at an associated retail point of sale location 160 the account to which the card is linked and any virtual reserves associated with the account may be determined at step 1010. If no virtual reserves are associated with the account the card holder may be charged the prevailing retail price at the retail point of sale location 160 for the quantity of fuel purchased and the charge directly billed to a credit card or other method of payment associated with the account at step 1020 and data associated with the transaction collected at step 1030. This data may include almost any manner of data associated with a particular transaction including the price, quantity of fuel purchased, whether the retail point of sale location was an affinity retail point of sale location, etc.

If however, there is at least one virtual reserve associated with the account it may be determined if the prevailing retail price at the retail point of sale location 160 is greater than any of the lock prices associated with the virtual reserves at step 1040. If the retail price is greater than the lock price associated with any virtual reserve associated with the account the card holder may be charged the prevailing retail price at the retail point of sale location 160 for the quantity of fuel purchased, the charge directly billed to a credit card or other method of payment associated with the account at step 1020 and data associated with the transaction collected at step 1030.

Otherwise it may be determined at step 1050 if the prevailing retail price at the retail point of sale location 160 is greater than any lock price associated with a virtual reserve plus any price tolerance associated with that virtual reserve at step 1050. If so it can then be determined at step 1060 if there are multiple virtual reserves and, at step 1070, one of the virtual reserves chosen based on a variety of factors such as the prevailing retail price, the lock price associated with each of the virtual reserves, any price tolerance associated with each of the virtual reserves, a grade associated with each reserve, etc. The transaction conducted at the retail point of sale location 160 can then be processed against the chosen virtual reserve or the single virtual reserve associated with the account at step 1080. This processing may entail subtracting the quantity of fuel purchased by the user from the quantity associated with the virtual reserve against which the transaction is being processed.

The operators of price protection system 120 may then reimburse retail point of sale location 160 for the purchased fuel at step 1090. The amount paid by operators of price protection system 120 to retail point of sale location 160 may correspond to the prevailing retail price at the time the fuel was purchased by the card holder or may be some lesser or greater amount based upon any agreements between operators of price protection system 120 and the operator of the retail point of sale retail location 160 (e.g. the retail point of sale location 160 may be an affinity retail point of sale location as discussed above).

From the price paid to the retail point of sale location 160 at step 1082 a reimbursement amount may be determined at step 1084, where the reimbursement amount may be the price paid per gallon to the retail point of sale location minus the financial institution strike price (e.g. per gallon) associated with the virtual reserve against which the transaction has been processed multiplied times the number of gallons purchased by the card holder. It is important to note here, however, that the reimbursement may be calculated with respect to any financial institution strike price for which a right of indemnification was obtained by operators of price protection system 120.

As price protection system 120 may provide price protection contracts for a large number of consumers the quantity of fuel, number of financial institution strike prices, grades and locales for which operators of price protection system 120 have obtained a right of indemnification may be immense. In some cases therefore, it may be financially advantageous for operators of price protection system 120 to calculate a reimbursement amount pertaining to a fuel purchase corresponding to one price protection contract with respect to a right of indemnification obtained in conjunction with provisioning of one or more other. No matter the calculation method used to determine the reimbursement amount, however, after the reimbursement amount is determined at step 1084 this reimbursement amount may then be forwarded to financial institution 140 and reimbursement paid by the financial institution 140 to the operators of price protection system 120 at step 1086.

Additionally, data pertaining to the transaction may be collected at step 1030. As noted above, this data may include almost any manner of data associated with a particular transaction including the price, quantity of fuel purchased, whether the retail point of sale location was an affinity retail point of sale location, etc. The data collected on the transaction may then be analyzed at step 1090 according to any a number of parameters, such as locale, quantity purchased, retail price purchase, money saved by using virtual reserve, etc. Similarly, the data from this transaction may be aggregated with data collected from other transactions (which may or may not have been conducted by a card holder affiliated with the same account) and processed accordingly. The results from any processing of the transaction data may then be displayed to a fleet manger at step 1092 when the fleet manager next accesses price protection system 120. Additionally, the data collected on this transaction or aggregated from multiple transactions may also be sent to financial institution 140 at step 1094 such that financial institution 140 may utilize the data as they best see fit, such as for example calculating a future financial institution strike price matrix.

Figure 11:
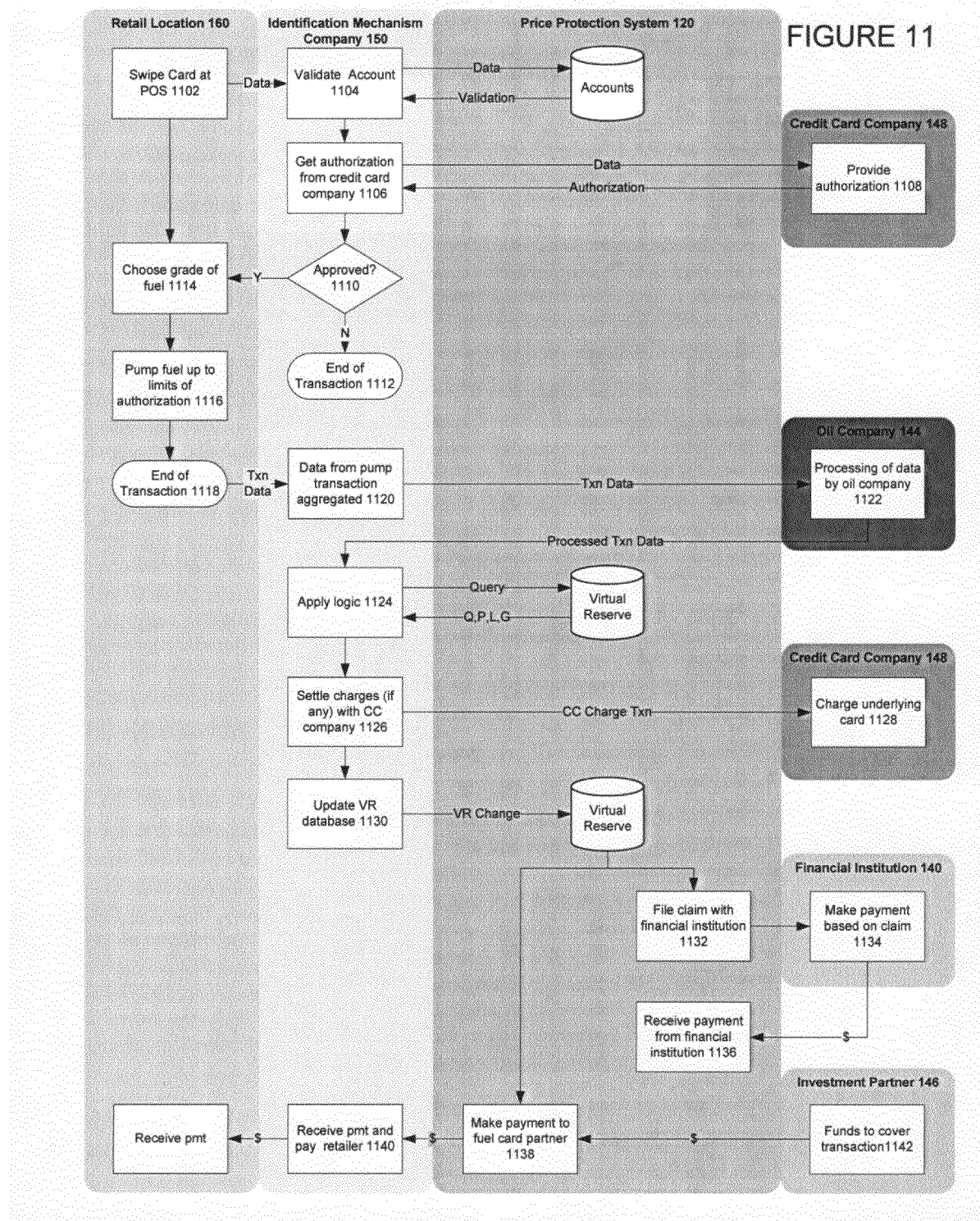
FIG. 11 is a flow diagram illustrating one embodiment of a method for processing a transaction.

It may be useful here to explain with more detail the processing of a transaction initiated by a card holder. To that end, FIG. 11 depicts a flow diagram of one embodiment of processing a transaction. At a retail point of sale location 140 a card holder may swipe a card associated with an account at price protection system 120 at a fuel pump at retail point of sale location 160 to purchase fuel at step 1102. Data pertaining to the card may then be sent from the retail point of sale location 160 to identification mechanism company 150 which, at step 1104, may validate that the card is associated with a valid account of price protection system 120. This validation may entail the communication of validation data from the identification company 150 to price protection system 120, where price protection system 120 may check account information stored in data store 122 to determine if the card is associated with a valid account and send the validation data back to identification mechanism company 150. Based on the validation data sent from price protection system 120, identification mechanism company 150 may get authorization for the credit card which is associated with the account at step 1106 by sending the credit card data to credit card company 148 to obtain this authorization. Credit card company may then choose to authorize this transaction, or not, and send the authorization data back to identification mechanism company 150 at step 1108.

If credit card company 148 has not provided authorization, as determined at step 1110, the transaction may be terminated at step 1112. Otherwise, the card holder may choose the grade of fuel he desires at step 1114 and, at step 1116, pump fuel up to the limits of the authorization provided at step 1108 by credit card company 148. At this point the transaction at retail point of sale location 160 is completed at step 1118. After the transaction at the retail point of sale location 160 is completed at step 1118, data regarding the transaction such as the quantity and grade of fuel pumped by the card holder, the prevailing retail price for the grade of fuel at retail point of sale location 160, etc. is transmitted to identification mechanism company 150 which aggregates this information at step 1120 and transmits the data to oil company 144 for processing at step 1122. The processed transaction data may then be retuned from oil company 144 to identification mechanism company 150 where identification mechanism company 150 may apply logic to the transaction to determine how the transaction is to be processed at step 1124. The application of this logic may entail one or more queries to price protection system 120 to determine any virtual reserves associated with the account or the quantity, lock price, locales or grade corresponding to each of the associated virtual reserves.

Using the information from price protection system 120, identification mechanism company 150 may settle any charges with credit card company 148 at step 1126 by sending data pertaining to the credit card charge to credit card company 148, which may charge the credit card at step 1128. Identification mechanism company 150 may also update any virtual reserves affected by the transaction at step 1130. This may comprise sending data from identification mechanism company 150 to price protection system 120 such that any affected virtual reserve may be changed (e.g. the quantity of fuel purchased subtracted from the quantity associated with the affected virtual reserve). Based upon the change in a virtual reserve, at step 1132 operators of price protection system 120 may file a claim with financial institution 140 based on the amount of fuel purchased, the retail price of the fuel at the time of purchase and a financial institution strike price (as discussed above). Financial institution 140 may then make a payment to operators of price protection system 120 at step 1134 and this reimbursement amount received from financial institution 140 at step 1136.

Additionally, the operators of price protection system 120 may make payments to the identification mechanism company 150 at step 1138 such that identification mechanism company 150 may pay retail point of sale location at step 1140. The money to cover this payment may come from investment partner 146 at step 1142, which may be holding these funds in a trust account. The amount paid by operators of price protection system 120 to retail point of sale location 160 may correlate with the prevailing retail price at the time the fuel was purchased by the card holder or may be some lesser or greater amount based upon any agreements between operators of price protection system 120 and the operator of the retail point of sale location 160.

It may be helpful to an understanding of embodiments of the systems and methods of the present invention to further illustrate some of the concepts presented herein with actual numerical examples. Suppose price protection system 120 offers a consumer a price protection contract for price protection on the retail price of fuel, where the price protection contract corresponds to all locale(s) in the nation and a lock price based on a financial institution strike price matrix comprising 4000 prices representing the financial institution strike price of fuel in 4000 counties across the United States. Further assume that in the county where the consumer will buy fuel the lock price is $2.00 which is a slight premium to the current prevailing retail pump price (e.g. $1.90 on the day the consumer obtains the price protection contract). Further suppose that the consumer obtains this price protection contract with an associated quantity of 100 gallons and a time period of 12 months.

At this point the consumer may be asked by operators of price protection system 120 for pre-payment for the 100 gallons of fuel. Thus, the consumer may access price protection system 120 through computing device 110 and provide credit card information such that a pre-payment sum of $200 (e.g. 100 gallons at a lock price of $2.00 a gallon) is charged to the credit card and the payment forwarded to the operators of price protection system 120. This $200 may be deposited by operators of price protection system 120 in a trust account which operators of price protection system 120 may have with investment partner 146 such that the $200 begins earning interest in the trust account.

Additionally, as part of a contract with operators of price protection system 120 (e.g. in order to utilize the services provided by price protection system 120) the consumer may pay either a membership fee to operators of price protection system (e.g. an annual fee of $45 dollars that entitles them to obtain one or more price protection contracts for price protection on up to 1000 gallons of fuel) or a per gallon "lock fee", which may be for example 20 cents per gallon on which price protection is obtained (e.g. in this case $20). This additional lock fee charged to the consumer by operators of price protection system 120 may also be billed to the credit card provided by the consumer. From an accounting perspective this $20 may be considered revenue to operators of price protection system 120 as opposed to the $200 dollars provided by for the consumer for pre-payment which is held in trust for a possible future purchase of fuel.

The operators of price protection system 120 may then enter into a contract with financial institution 140, where financial institution 140 assumes basis risk for the price movement of fuel above a financial institution strike price for one year. The financial institution charges the operators of price protection system $0.15 cents per gallon (e.g. $15.00 on 100 gallons) to assume this risk. Assuming the financial institution strike price is $2.00 a gallon, in this case the operators of price protection system 20 may have earned a $5.00 on the 100 gallons associated with the price protection contract, as the consumer paid $0.20 for price protection on each gallon of fuel while the operator of price protection system 120 paid only $0.15 per gallon to financial institution 140 to obtain this price protection.

Further assume that price protection system 120 is given a $0.5 per gallon retail price discount from affinity retail point of sale locations 160 and consumers get a $0.2 per gallon rebate which may be utilized for subsequent purchases of fuel using price protection system 120. Now suppose that at exactly one day less than one year after obtaining the price protection contract the consumer purchases 50 gallons of fuel at an affinity point of sale retail location 160 for $3.00 per gallon using an identification card tied to his account and 50 gallons at a point of sale retail location 160 that is not an affinity location for $3.00 per gallon using the same identification card.

At the time of those two transactions, the following economic events may transpire. With respect to the non-affiliated point of sale retail location 160: $150 is charged through the pump system using the identification card utilized by the consumer, and the operators of price protection system 120 remit a $150 charge to identification card company 148 which is then paid by credit card company 148 to the retail point of sale location 160. The 50 gallons purchased by the consumer is debited from the consumer's virtual reserve (e.g. 50 gallons at the 2.00 per gallon for a total of $100). This $100 may then be moved from the trust account at investment partner 146 to operators of price protection system 120 such that the $100 then becomes gross revenue for the operators of price protection system 120. The operators of price protection system 120 may then inform financial institution 140 of the transaction and financial institution 140 remits to the operators of price protection system 120 the differential between the retail price ($3.00) at the time of purchase and the financial institution strike price ($2.00) for every gallon of fuel purchased ($1.00 for 50 gallons=$50).

With respect to the affinity retail point of sale location 160: $150 dollars (the retail price for the 50 gallons of fuel purchased by the consumer) is charged through the pump system using the identification card utilized by the consumer and the operators of price protection system 120 remits $147.50 (the contractual affinity discount provided by the retailer, $0.05 per gallon or $2.50, is subtracted from the retail price). The 50 gallons purchased is debited from the consumer's virtual reserve (e.g. 50 gallons at the 2.00 per gallon for a total of $100). This $100 may then be moved from the trust account at investment partner 140 to operators of price protection system 120 such that the $100 then becomes gross revenue for the operators of price protection system 120. Price protection system 120 may also associate a "credit" of $1 (e.g. 50 gallons at 2 cent per gallon affinity rebate) with the account of the consumer, where this credit may be utilized for future purchases utilizing price protection system 120. The operators of price protection system 120 may then inform financial institution 140 of the transaction, and financial institution 140 remits to the operators of price protection system 120 the differential between the net retail price (e.g. $2.85: $3.00 less the 5% affinity discount) and the contract strike price ($2.00)×50=$42.50.

Now suppose that instead of purchasing fuel, at one day before the expiration of the year covered by the obtained price protection contract the consumer approaches the operators of price protection system 120 and because the consumer had no need for fuel during the year (or fuel was consistently below the lock price, etc.), the consumer wants to dispose of the price protection contract. Further suppose that on that day the consumer's price protection contracts worth $100 (prevailing retail price—lock price). In one embodiment, price protection system 120 may provide a contract novation where operators of price protection system 120 will purchase price protection contracts at some fraction (e.g. one half) of the then prevailing value. In this case, the consumer's pre-payment of $200 is refunded from the trust account held at investment partner 146 less the $50 dollars charged to the consumer for the contract novation, financial institution 140 remits to operators of price protection system 120 $75 in insurance related to the indemnification obtained from financial institution 140 by operators of price protection system 120. Thus, operators of price protection system 120 may have a $25 profit margin under this scenario.

Figure 12A:
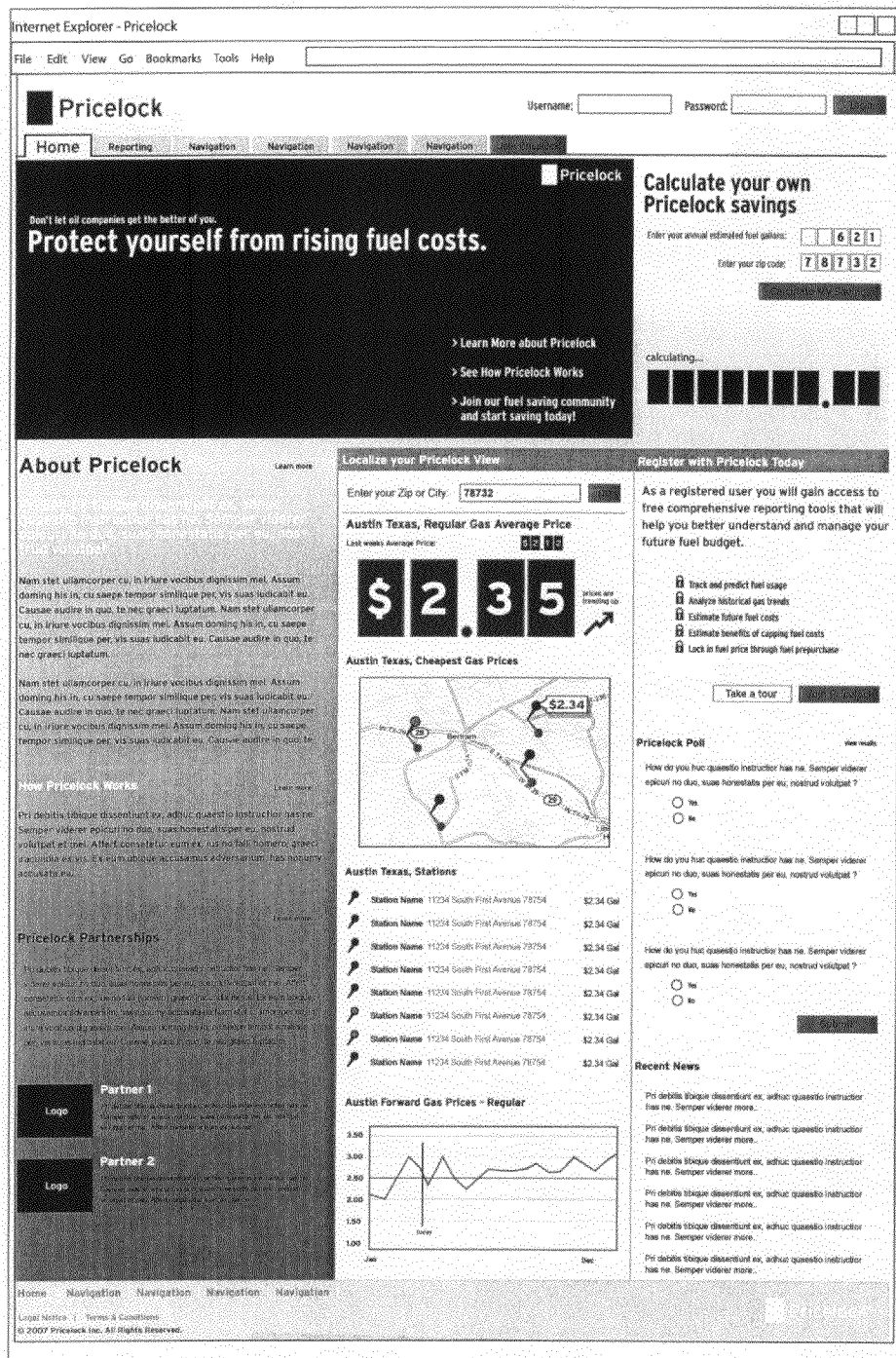
FIGS. 12A and 12B are embodiments of interfaces which may be presented to a user.
Figure 12B:
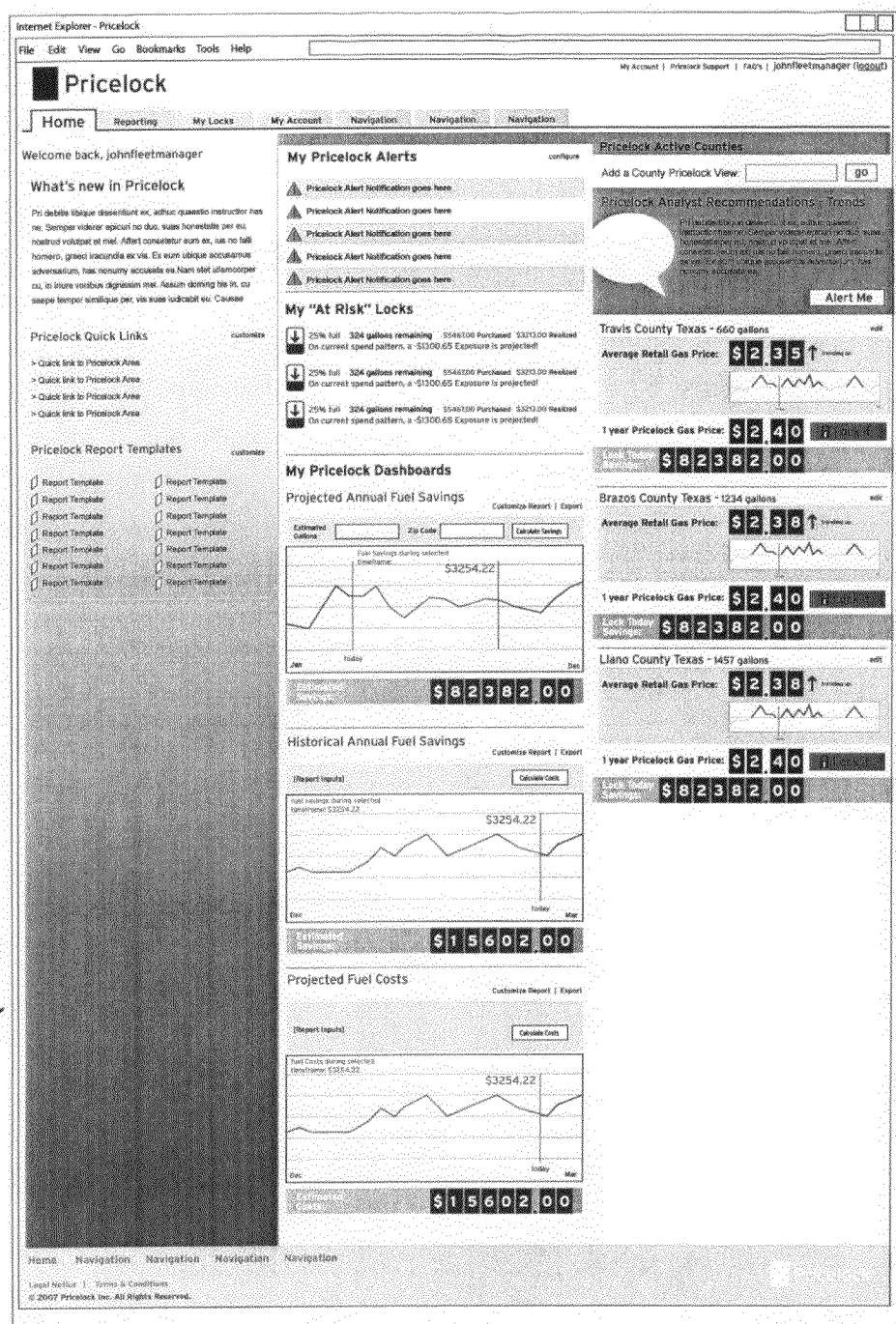

Moving now to FIGS. 12A and 12B, it may also be helpful to an understanding of embodiments of the present invention to present examples of interfaces which may be presented by price protection system 120 to users at computing devices 110. FIGS. 12A and 12B are thus embodiments of interfaces which may be presented to users of price protection system 120 at computer devices 110.

More specifically, FIG. 12A is one embodiment of a pre-login web page 1200 presented to users accessing price protection system 120 at a computer device 110 who either do not yet have an account or have not yet logged in to their account. Price protection system 120 may analyze browser cookies, or other otherwise determine, a locale of interest to the user at computer device 110 and present current average gas prices in that locale along with forward market projections for that locale to the user on web page 1200. Furthermore, web page 1200 may offer the user the ability to calculate an estimate of savings which may be obtained and present other information about the operation of price protection system 120.

FIG. 12B is one embodiment of a web page 1210 presented to users accessing price protection system 120 at a computer device 110 who have created, or logged into, an existing account. Here web page 1210 may present to the user a series of analytics and one or more price protection contracts along with projected coast savings for these price protection contracts, along with a myriad number of other capabilities which a user may select or utilize, such as reporting, etc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for providing price protection for commodity purchasing, by providing a price protection system computer having a data store and a processor executing instructions for performing the method comprising:

the following steps performed by the price protection system:

obtaining, by the price protection system computer coupled to a network, data regarding desired price protection from each consumer in a plurality of consumers accessing an interface provided by the price protection system computer, wherein the data for each consumer includes information about past commodity consumption for that consumer, a time period for price protection, a locale and a desired level of price protection;

analyzing, by the computer processor, the data for each consumer to predict future commodity consumption for that consumer within the locale and the time period included in the consumer data, wherein the analysis includes identifying the locale or time period in which the commodity is to be purchased and predicting a future commodity usage;

obtaining, from a financial institution computer coupled to the price protection system computer, a price protection matrix comprising a set of price decks, wherein each price deck includes an associated locale, a time period, and a strike price corresponding to a lock price associated with the commodity, wherein at least one locale in the price protection matrix corresponds to the locale included in the consumer data;

comparing, by the price protection system computer, the consumer data and the price protection matrix to determine one or more price protection contracts for each consumer, wherein for each consumer the price protection computer is further operable to perform the steps of:

providing a price protection contract for the commodity to that consumer based on that consumer's time period, the at least one locale included in the consumer data and desired level of price protection;

storing data associated with each price protection contract in the data store, wherein the data comprises an associated time period, a lock price associated with the locale included in the consumer data and information associated with an identification mechanism, communicating with a plurality of retail locations to obtain purchase information; wherein for each purchase information received by the price protection system computer, the price protection system computer is operable to perform the steps of:

identifying the price protection contract associated with the identification mechanism;

obtaining information associated with the purchase of the commodity from a retail location coupled to the network;

determining, based on the information obtained from the retail location, a location of the purchase;

comparing, by the computer processor, one or more price protection contract terms with the information associated with the purchase of the commodity, wherein if the purchase is determined to occur at a location within the locale included in the consumer data, the price protection system computer is operable to:

bill the consumer based on the lock price stored in the data store; and bill the financial institution at least a portion of the amount of the purchase price of the commodity at the time of the purchase that is above the lock price, otherwise if the purchase is determined to occur at a location outside the locale included in the consumer data, the price protection system computer is operable to:
bill the consumer the purchase price of the commodity.

2. The method of claim 1, wherein the commodity is fuel and the price protection contract has an associated fuel grade.

3. The method of claim 2, further comprising:
determining, by the price protection system computer, a set of price protection contracts based upon the data regarding the desired price protection; and
presenting, by the price protection system computer, the set of price protection contracts to the consumer, wherein the consumer selects the price protection contract from the set of price protection contracts.

4. The method of claim 2, further comprising obtaining, by the price protection system computer, pre-payment for the quantity of fuel at the lock price.

5. The method of claim 4, further comprising refunding, by the price protection system computer, any unused pre-payment to the consumer at the end of the time period.

6. The method of claim 5, further comprising placing, by the price protection system computer, the pre-payment in an interest earning account.

7. The method of claim 4, wherein the consumer is charged a fee to obtain the price protection contract.

8. The method of claim 2, further comprising determining, by the price protection system computer, the lock price, wherein determining the lock price comprises:
providing an aggregated demand to a financial institution;
receiving the strike price matrix from the financial institution; and
determining the lock price based on the institution strike price of the financial institution strike price matrix, the locale, the time period and the fuel grade.

9. The method of claim 8, wherein the lock price includes a markup, wherein the markup is determined based on the insurance cost.

10. The method of claim 2, wherein providing the price protection contract further comprises obtaining, by the price protection system computer, a right of indemnification corresponding to the price protection contract from the financial institution.

11. The method of claim 10, wherein obtaining the right of indemnification comprises paying, by the price protection system computer, the financial institution the insurance cost for the quantity.

12. The method of claim 11, wherein providing the price protection contract further comprises creating, by the price protection system computer, a virtual reserve, wherein the virtual reserve has a set of variables corresponding to the price protection contract, including the quantity.

13. The method of claim 12, wherein one of the set of variables is a price tolerance set by the consumer.

14. The method of claim 13, wherein the purchase occurs at a location in a set of associated retail point of sale locations in the locale.

15. The method of claim 14, wherein the set of associated retail point of sale locations comprise one or more affinity retail point of sale locations.

16. The method of claim 15, wherein the one or more affinity retail point of sale locations provides an affinity push commission.

17. The method of claim 16, wherein the one or more affinity retail point of sale locations pay an affinity fee.

18. The method of claim 15, further comprising processing a purchase at an associated retail point of sale location, wherein processing a purchase comprises determining if the retail price at the time of the purchase is above the lock price plus the price tolerance, wherein if the retail price is below the lock price plus the price tolerance billing the consumer at the retail price and if the retail price is above the lock price plus the price tolerance paying the associated retail point of sale location, determining a reimbursement amount and receiving this reimbursement amount from the financial institution.

19. The method of claim 18, wherein the reimbursement amount is determined based on the financial institution strike price and a price paid to the retail point of sale location.

20. The method of claim 19, wherein the price paid to the retail point of sale location is less than the retail price.

21. The method of claim 20, wherein processing the transaction further comprises subtracting, by the price protection system computer, a purchased quantity from the variable of the virtual reserve corresponding to the quantity.

22. The method of claim 21, further comprising:
gathering, by the price protection system computer, data on the purchase; and
reporting, by the price protection system computer, the gathered data to the financial institution.

23. The method of claim 22, wherein the financial institution pays for the gathered data.

24. A system for providing price protection for commodity purchasing, comprising:
a price protection system comprising a processor and a non-transitory computer readable medium for storing instructions and coupled to one or more computing devices and a data store via a network such that a consumer at a computer device may access the price protection system, the price protection system operable for performing the steps comprising:
obtaining data regarding desired price protection from the plurality of consumers, wherein the data for each of the consumers includes a desired price protection for a commodity within a locale based on the consumer's anticipated demand for the commodity in the locale during the time period;
providing, using the price protection system, a price protection contract for the commodity to each consumer based on that consumer's desired price protection, wherein each price protection contract has a set of terms comprising an associated time period for consumption, an associated lock price and the locale, wherein the lock price associated with each price protection contract is determined based upon a strike price matrix provided by a financial institution, the strike price matrix comprising at least one strike price and associated insurance cost, and a future price corresponding to an anticipated future price of the commodity within the locale during the time period of the set of terms of that price protection contract,
storing data associated with each price protection contract in the data store, wherein the data comprises an associated time period, a lock price associated with the locale included in the consumer data and information associated with an identification mechanism;
communicating with a plurality of retail locations to obtain purchase information, wherein for each purchase information, the price protection system is further operable to perform the steps of:
identifying the price protection contract associated with the identification mechanism;
comparing, by the computer processor, one or more price protection contract terms with the information associated with the purchase of the commodity, wherein each purchase determined to occur at a retail location within the locale the commodity is purchased at the lock price if a retail price of the commodity at a time of the purchase is above the lock price or at the retail price otherwise, otherwise each purchase determined to occur at a retail location outside the locale the commodity is purchased at the retail price.

25. The system of claim 24, wherein the commodity is fuel and the price protection contract has an associated fuel grade.

26. The system of claim 25, wherein the price protection system is further operable for:
   determining a set of price protection contracts based upon the data regarding the desired price protection; and
   presenting the set of price protection contracts to the consumer, wherein the consumer selects the price protection contract from the set of price protection contracts.

27. The system of claim 25, wherein the price protection system is further operable for obtaining pre-payment for a quantity of fuel at the lock price.

28. The system of claim 27, wherein the price protection system is further operable for refunding any unused pre-payment to the consumer at the end of the time period.

29. The system of claim 28, wherein the pre-payment is placed in an interest earning account.

30. The system of claim 27, wherein the consumer is charged a fee to obtain the price protection contract.

31. The system of claim 25, wherein the price protection system is further operable for determining the lock price, wherein determining the lock price comprises:
   providing an aggregated demand to a financial institution;
   receiving the strike price matrix from the financial institution; and
   determining the lock price based on the institution strike price of the financial institution strike price matrix, the locale, the time period and the fuel grade.

32. The system of claim 31, wherein the lock price includes a markup, the markup determined based on the insurance cost.

33. The system of claim 25, wherein providing the price protection contract further comprises obtaining a right of indemnification corresponding to the price protection contract from the financial institution.

34. The system of claim 33, wherein obtaining the right of indemnification comprises paying the financial institution the insurance cost for the quantity.

35. The system of claim 34, wherein providing the price protection contract further comprises creating a virtual reserve, wherein the virtual reserve has a set of variables corresponding to the price protection contract, including the quantity.

36. The system of claim 35, wherein one of the set of variables is a price tolerance set by the consumer.

37. The system of claim 36, wherein the set of purchases occur at a set of associated retail point of sale locations in the locale.

38. The system of claim 37, wherein the set of associated retail point of sale locations comprise one or more affinity retail point of sale locations.

39. The system of claim 38, wherein the affinity retail point of sale locations provides an affinity push commission.

40. The system of claim 39, wherein the affinity retail point of sale locations pay an affinity fee.

41. The system of claim 40, wherein the price protection system is further operable for processing a purchase at an associated retail point of sale location, wherein processing a purchase comprises determining if the retail price at the time of the purchase is above the lock price plus the price tolerance, wherein if the retail price is below the lock price plus the price tolerance billing the consumer at the retail price and if the retail price is above the lock price plus the price tolerance paying the associated retail point of sale location, determining a reimbursement amount and receiving this reimbursement amount from the financial institution.

42. The system of claim 41, wherein the reimbursement amount is determined based on the financial institution strike price and a price paid to the retail point of sale location.

43. The system of claim 42, wherein the price paid to the retail point of sale location is less than the retail price.

44. The system of claim 43, wherein processing the transaction further comprises subtracting a purchased quantity from the variable of the virtual reserve corresponding to the quantity.

45. The system of claim 44, wherein the price protection system is further operable for:
   gathering data on the purchase; and
   reporting the gathered data to the financial institution.

46. The system of claim 45, wherein the financial institution pays for the gathered data.

* * * * *